(12) United States Patent
Ishizu

(10) Patent No.: US 10,372,294 B2
(45) Date of Patent: Aug. 6, 2019

(54) INFORMATION PROCESSING APPARATUS AND UPDATE INFORMATION NOTIFICATION METHOD

(71) Applicant: SONY CORPORATION, Tokyo (JP)

(72) Inventor: Kento Ishizu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 303 days.

(21) Appl. No.: 14/893,269

(22) PCT Filed: Apr. 30, 2014

(86) PCT No.: PCT/JP2014/062007
§ 371 (c)(1),
(2) Date: Nov. 23, 2015

(87) PCT Pub. No.: WO2014/192496
PCT Pub. Date: Dec. 4, 2014

(65) Prior Publication Data
US 2016/0110034 A1 Apr. 21, 2016

(30) Foreign Application Priority Data
May 29, 2013 (JP) ................. 2013-112965

(51) Int. Cl.
*G06F 3/0482* (2013.01)
*G06F 3/0485* (2013.01)
(Continued)

(52) U.S. Cl.
CPC ......... *G06F 3/0482* (2013.01); *G06F 3/0485* (2013.01); *G06F 3/04855* (2013.01); *G06F 3/04883* (2013.01); *G06F 16/904* (2019.01)

(58) Field of Classification Search
CPC .. G06F 3/0482; G06F 3/0485; G06F 3/04855; G06F 3/04883; G06F 17/30994
See application file for complete search history.

(56) References Cited

U.S. PATENT DOCUMENTS 5,495,566 A * 2/1996 Kwatinetz ............. G06F 3/0485
345/684
5,550,969 A * 8/1996 Torres ................. G06F 3/04855
345/684
(Continued)

FOREIGN PATENT DOCUMENTS

JP 09-198229 A 7/1997
JP 2012-521049 A 9/2012
(Continued)

OTHER PUBLICATIONS

Yukiko Sato; IT Media-Facebook; Formal Android application are speeded up in updated non-HTML5; Dec. 14, 2012; 5 pages; Japan; with English Translation.

*Primary Examiner* — Jung-Mu T Chuang
(74) *Attorney, Agent, or Firm* — Chip Law Group

(57) ABSTRACT

To further improve convenience of a user, there is provided an information processing apparatus including: a content information set generation unit configured to generate a content information set including a series of content information pieces in a predetermined arrangement sequence, the content information pieces being displayed in a predetermined area on a display screen; an update detection unit configured to detect an updated content information piece from among the content information pieces constituting the content information set; and a display control unit configured to display, on the display screen, an indicator indicating at least a positional relation of an updated part with respect to the whole content information set while displaying at least a part of the content information set on the display screen in the arrangement sequence, the updated part corresponding to the updated content information piece from among the content information set.

15 Claims, 8 Drawing Sheets

(51) Int. Cl.
*G06F 3/0488* (2013.01)
*G06F 16/904* (2019.01)

(56) References Cited

U.S. PATENT DOCUMENTS

| | | | | |
|---|---|---|---|---|
| 5,623,588 A * | 4/1997 | Gould | | G06F 3/04855 345/157 |
| 5,952,995 A * | 9/1999 | Barnes | | G06F 3/0485 345/157 |
| 6,204,846 B1 * | 3/2001 | Little | | G06F 3/04855 715/784 |
| 6,374,102 B1 * | 4/2002 | Brachman | | H04W 76/00 455/422.1 |
| 6,778,192 B2 * | 8/2004 | Arbab | | G06F 3/04855 345/684 |
| 6,816,174 B2 * | 11/2004 | Tiongson | | G06F 3/04855 715/716 |
| 7,080,127 B1 * | 7/2006 | Hickman | | H04L 67/34 709/208 |
| 7,100,069 B1 * | 8/2006 | Hickman | | G06Q 10/10 709/208 |
| 7,475,360 B2 * | 1/2009 | Keohane | | G06F 3/0485 715/784 |
| 7,802,196 B2 * | 9/2010 | Brunner | | G06F 3/0485 345/545 |
| 7,930,646 B2 * | 4/2011 | De Souza Sana | | G06F 3/0481 715/784 |
| 7,996,786 B2 * | 8/2011 | MacLaurin | | G06F 17/30554 715/764 |
| 8,607,156 B1 * | 12/2013 | Jania | | G06F 3/04855 715/786 |
| 8,713,471 B1 * | 4/2014 | Rowley | | G06F 3/0485 715/784 |
| 8,754,890 B2 * | 6/2014 | Gilmore | | G06F 3/04855 345/419 |
| 8,806,380 B2 * | 8/2014 | Moon | | G06F 3/0482 715/856 |
| 8,812,977 B2 * | 8/2014 | Naderi | | G06F 3/04855 715/787 |
| 8,881,012 B2 * | 11/2014 | Siracusano, Jr. | | G06F 3/0481 715/720 |
| 8,887,050 B1 * | 11/2014 | Siracusano, Jr. | | G06F 3/0481 715/716 |
| 8,887,085 B1 * | 11/2014 | Cox | | G06F 3/04855 715/786 |
| 8,910,073 B2 * | 12/2014 | Mercer | | G06F 3/0485 382/174 |
| 9,134,873 B2 * | 9/2015 | Kies | | G06Q 30/02 |
| 9,170,721 B2 * | 10/2015 | Kim | | G06F 3/04847 |
| 9,268,475 B2 * | 2/2016 | Lawrence | | G06F 3/04855 |
| 9,329,744 B2 * | 5/2016 | Treitman | | G06F 3/04855 |
| 9,552,150 B2 * | 1/2017 | Schaller | | G06F 3/04855 |
| 2002/0093496 A1 * | 7/2002 | Gould | | G06F 3/04855 345/204 |
| 2002/0109728 A1 * | 8/2002 | Tiongson | | G06F 3/04855 715/786 |
| 2002/0145631 A1 * | 10/2002 | Arbab | | G06F 3/04855 715/786 |
| 2005/0120361 A1 * | 6/2005 | Bailey | | G06F 3/0482 719/328 |
| 2005/0210118 A1 * | 9/2005 | Hickman | | H04L 67/08 709/208 |
| 2007/0038953 A1 * | 2/2007 | Keohane | | G06F 3/0485 715/784 |
| 2008/0158261 A1 * | 7/2008 | Gould | | G06F 3/04855 345/666 |
| 2008/0165141 A1 * | 7/2008 | Christie | | G06F 3/044 345/173 |
| 2008/0178116 A1 * | 7/2008 | Kim | | G06F 3/04847 715/786 |
| 2008/0212945 A1 * | 9/2008 | Khedouri | | G06F 17/30038 386/291 |
| 2008/0222570 A1 * | 9/2008 | MacLaurin | | G06F 16/9535 715/839 |
| 2009/0070707 A1 * | 3/2009 | Schaller | | G06F 3/04855 715/787 |
| 2009/0106687 A1 * | 4/2009 | De Souza Sana | | G06F 3/0481 715/784 |
| 2009/0106688 A1 * | 4/2009 | Keohane | | G06F 3/0485 715/786 |
| 2009/0138815 A1 * | 5/2009 | Mercer | | G06F 3/0485 715/786 |
| 2009/0167508 A1 * | 7/2009 | Fadell | | G06F 3/016 340/407.2 |
| 2009/0222765 A1 * | 9/2009 | Ekstrand | | G06F 3/0485 715/818 |
| 2010/0077353 A1 * | 3/2010 | Moon | | G06F 3/0482 715/832 |
| 2010/0107066 A1 * | 4/2010 | Hiitola | | G06F 3/0485 715/702 |
| 2010/0231534 A1 * | 9/2010 | Chaudhri | | G06F 3/0481 345/173 |
| 2010/0231535 A1 * | 9/2010 | Chaudhri | | G06F 3/0481 345/173 |
| 2010/0231536 A1 * | 9/2010 | Chaudhri | | G06F 3/0481 345/173 |
| 2011/0025717 A1 * | 2/2011 | Gilmore | | G06F 3/04855 345/661 |
| 2011/0066984 A1 * | 3/2011 | Li | | G06F 3/04883 715/863 |
| 2011/0119588 A1 * | 5/2011 | Siracusano, Jr. | | G06F 3/0481 715/723 |
| 2011/0270876 A1 * | 11/2011 | Gill | | G06F 16/33 707/769 |
| 2012/0042279 A1 * | 2/2012 | Naderi | | G06F 3/04855 715/786 |
| 2012/0054793 A1 * | 3/2012 | Kang | | H04L 12/2812 725/38 |
| 2012/0079421 A1 * | 3/2012 | Arriola | | G06F 3/04812 715/784 |
| 2012/0221632 A1 * | 8/2012 | McCormack | | G06Q 10/107 709/203 |
| 2012/0266068 A1 * | 10/2012 | Ryman | | G06F 3/0485 715/719 |
| 2013/0007030 A1 * | 1/2013 | Klawitter | | G06F 16/9577 707/758 |
| 2014/0033099 A1 * | 1/2014 | Treitman | | G06F 3/04855 715/768 |
| 2014/0074821 A1 * | 3/2014 | Bailey | | G09G 5/00 707/722 |
| 2014/0137013 A1 * | 5/2014 | Matas | | G06F 3/0488 715/764 |
| 2014/0172654 A1 * | 6/2014 | Wagner | | G06Q 40/12 705/30 |
| 2014/0208261 A1 * | 7/2014 | Bhogal | | G06F 3/04855 715/787 |
| 2014/0258920 A1 * | 9/2014 | Lawrence | | G06F 3/04855 715/786 |
| 2017/0052649 A1 * | 2/2017 | Alcorn | | G06F 3/0481 |
| 2017/0075557 A1 * | 3/2017 | Noble | | G06F 3/04855 |
| 2017/0090743 A1 * | 3/2017 | Schaller | | G06F 3/04855 |
| 2017/0094636 A1 * | 3/2017 | Fadell | | G06F 3/016 |
| 2017/0199881 A1 * | 7/2017 | Arriola | | G06F 3/04883 |

FOREIGN PATENT DOCUMENTS

| | | |
|---|---|---|
| WO | 2010/107661 A1 | 9/2010 |
| WO | 2012/050833 A2 | 4/2012 |

* cited by examiner

INFORMATION PROCESSING APPARATUS AND UPDATE INFORMATION NOTIFICATION METHOD

TECHNICAL FIELD

The present disclosure relates to an information processing apparatus, an update information notification method, and a program.

BACKGROUND ART

When an information processing apparatus such as a personal computer (PC), a smartphone, or a tablet PC displays, on its display screen, only a part of an information set including information pieces in a predetermined arrangement sequence, it has become common to display an indicator on the display screen at the same time, the indicator indicating positional relations of the information pieces displayed on the display screen with respect to the whole information set. For example, Patent Literature 1 discloses a technology of displaying an indicator and movie content together on a display screen during reproducing the movie content, the indicator indicating reproduction time length of the movie content, a part of the movie content temporarily stored in a buffer, a reproduction speed of the movie content, and the like.

CITATION LIST

Patent Literature

Patent Literature 1: JP 2007-206809A

SUMMARY OF INVENTION

Technical Problem

On the other hand, it has become common to acquire and browse much information such as information on news and a social network service (SNS) by using various kinds of information processing apparatuses as described above. In a way similar to the technology of Patent Literature 1, there has been proposed a method using an indicator for providing much information for a user. That is to say, there has been used the indicator indicating the positional relation of the displayed information with respect to the whole arranged information set, while the information set in which information pieces are lined up in a predetermined arrangement sequence is generated and only a part of the whole information set is displayed on the display screen.

However, in a way different from the movie content in Patent Literature 1, quick reporting is regarded as important for the information on news and various kinds of social network services (SNSs), and the information is updated frequently. Accordingly, a configuration (for example, the number of information pieces constituting the information set, and a content of each information piece) of the arranged information set is updated frequently in a method for providing a user with a part of the arranged information set as described above. Therefore, it is difficult for the user who has referred to the display screen in which the information has been updated to distinguish information already referred by the user from unreferred information that has been added by the update, from among the arranged information set.

According to the above-described condition, it has been desired to improve convenience of the user at a time of referring to information, by causing a user to intuitively grasp updated information. Accordingly, the present disclosure proposes a novel and improved information processing apparatus, update information notification method, and program capable of further improving convenience of a user.

Solution to Problem

According to the present disclosure, there is provided an information processing apparatus including: a content information set generation unit configured to generate a content information set including a series of content information pieces in a predetermined arrangement sequence, the content information pieces being displayed in a predetermined area on a display screen; an update detection unit configured to detect an updated content information piece from among the content information pieces constituting the content information set; and a display control unit configured to display, on the display screen, an indicator indicating at least a positional relation of an updated part with respect to the whole content information set while displaying at least a part of the content information set on the display screen in the arrangement sequence, the updated part corresponding to the updated content information piece from among the content information set.

According to the present disclosure, there is provided an update information notification method including: generating a content information set including a series of content information pieces in a predetermined arrangement sequence, the content information pieces being displayed in a predetermined area on a display screen; detecting an updated content information piece from among the content information pieces constituting the content information set; and displaying, on the display screen, an indicator indicating at least a positional relation of an updated part with respect to the whole content information set while displaying at least a part of the content information set on the display screen in the arrangement sequence, the updated part corresponding to the updated content information piece from among the content information set.

According to the present disclosure, there is provided a program causing a computer to execute: a function of generating a content information set including a series of content information pieces in a predetermined arrangement sequence, the content information pieces being displayed in a predetermined area on a display screen; a function of detecting an updated content information piece from among the content information pieces constituting the content information set; and a function of displaying, on the display screen, an indicator indicating at least a positional relation of an updated part with respect to the whole content information set while displaying at least a part of the content information set on the display screen in the arrangement sequence, the updated part corresponding to the updated content information piece from among the content information set.

According to the present disclosure, a content information set generation unit generates a content information set including a series of content information pieces in a predetermined arrangement sequence, the content information pieces being displayed in a predetermined area on a display screen. In addition, an update detection unit 133 detects an updated content information piece from among the content information piece. In addition, a display control unit displays, on the display screen, an indicator indicating at least a positional relation of an updated part with respect to the whole content information set while displaying a part of the content information set on the display screen in the arrangement sequence, the updated part corresponding to the updated content information piece from among the content information set. Accordingly, by referring to the indicator, the user can quickly grasp a position of the updated part with respect to the whole content information set, and can quickly access the updated part.

Advantageous Effects of Invention

As described above, according to the present disclosure, it is possible to further improve convenience of a user.

DESCRIPTION OF EMBODIMENTS

Figure 1:
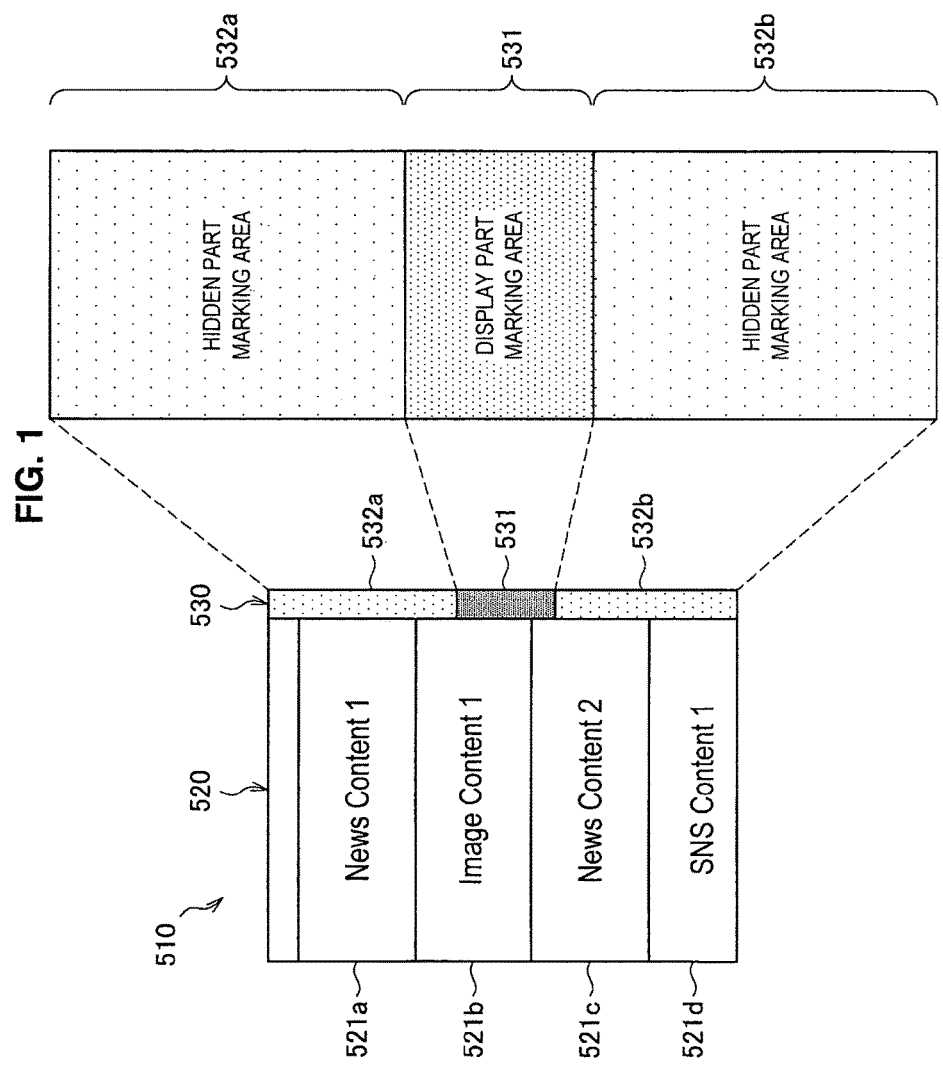
FIG. 1 is a schematic view showing an example of display of a general content information set and indicator.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Note that the description is given in the following order.
1. Overview of Update Information Notification Process
1-1. Display of General Content Information Set and Indicator
1-2. Update Information Notification Process according to Present Embodiment
2. Configuration of Information Processing Apparatus
3. Specific Example of Update Information Notification Process
3-1. First Specific Example
3-2. Second Specific Example
3-3. Third Specific Example
4. Procedure in Update Information Notification Method
5. Hardware Configuration
6. Conclusion
<1. OVERVIEW of Update Information Notification Process>

According to an embodiment of the present disclosure, there is generated a content information set including a series of content information pieces in a predetermined arrangement sequence, and a part of the content information set is displayed on a display screen in the arrangement sequence, the content information pieces being displayed in a predetermined area on the display screen. In addition, update of the content information set is detected, and an indicator is displayed on the display screen together with the part of the content information set, the indicator indicating at least a positional relation of the updated content information piece with respect to the whole content information set. Hereinafter, a series of processes performed in the present embodiment including at least the above described processes is referred to as an update information notification process.

Here, in the present embodiment, the content may be any content that may be processed by various kinds of information processing apparatuses. For example, the content may include news content, image content, movie content, and SNS content. Note that, the SNS content includes, for example, information on a comment and diary written (posted) by a user of the SNS.

The content information pieces may include various kinds of information on the content. For example, the content information pieces may include an overview (summary) of the content and date and time when the content has been updated (acquired). For example, in a case in which the content is the SNS content and includes information such as the comment and diary written in the SNS, the content information pieces may include a name of the SNS and information on a person who has written the comment and the diary (for example, a community to which the person belongs and a relationship with the user). In addition, the content information piece may include a content itself of the content.

In addition, it can be said that the content information piece displayed in a predetermined area on the display screen has a function as a headline indicating an overview of corresponding content. In the present embodiment, information displayed as the content information pieces on the display screen may include any types of information such as an image, a character, and a symbol.

Hereinafter, in [1-1. Display of General Content Information Set and Indicator], display of a general content information set and indicator is first explained so as to further clarify the present disclosure. Next, in [1-2. Update Information Notification Process according to Present Embodiment], display of a content information set and indicator according to an embodiment of the present disclosure is explained, and an overview of the update information notification process according to the present embodiment is also explained.

[1-1. Display of General Content Information Set and Indicator]

With reference to FIG. 1, there is explained an example of display of a general content information set and indicator. FIG. 1 is a schematic view showing an example of display of a general content information set and indicator.

With reference to FIG. 1, a general content information set 520 and a general indicator 530 are displayed on a display screen 510. In an example shown in FIG. 1, the display screen 510 is divided into two areas. At least a part of the content information set 520 is displayed in one area, and the indicator 530 is displayed in the other area.

In the content information set 520, content information pieces are lined up in a row (list) in a predetermined arrangement sequence. In the example shown in FIG. 1, the display screen 510 displays content information pieces 521a to 521d that are a part of the content information pieces constituting the content information set 520.

The content information pieces constituting the content information set 520 may be content information pieces indicating different kinds of various content. For example, with reference to FIG. 1, the content information piece 521a is "News Content 1", the content information piece 521b is "Image Content 1", the content information piece 521c is "News Content 2", and the content information piece 521d is "SNS Content 1". In a case in which the display screen 510 has a so-called touchscreen function, display of the content information set 520 is scrolled upward and downward by moving an operation body on the content information set 520 in an arrangement direction, in other words, in a vertical direction in the example shown in FIG. 1, and the content information pieces displayed on the display screen 510 change. In addition, when the operation body taps one of the content information pieces included in the content information set 520, an application for playing or browsing corresponding content may be activated, a detailed content of the content may be displayed on the display screen 510.

Like a bird's eye view, the indicator 530 indicates a positional relation of a part of the content information set 520 with respect to the whole content information set 520, the part being displayed on the display screen 510. In the example shown in FIG. 1, the indicator 530 is a so-called scroll indicator and has a linear shape stretching on the display screen 510 in the arrangement direction of the content information set 520, in other words, in the vertical direction of the display screen 510. The indicator 530 includes a display part marking area 531 indicating a part displayed on the display screen 510 from among the content information set 520, and hidden part marking areas 532a and 532b indicating parts hidden from the display screen 510 from among the content information set 520. In response to scrolling of display of the content information set 520, a position of the display part marking area 531 in the indicator 530 changes in real time.

The entire length of the indicator 530 corresponds to the entire length (quantity) of the whole content information set 520. The display part marking area 531 represents a positional relation and quantity of a part displayed on the display screen 510 with respect to the whole content information set 520. In the right side of FIG. 1, the enlarged indicator 530 is shown, and respective areas in the indicator 530 are conceptually shown. In addition, the display part marking area 531 and the hidden part marking areas 532a and 532b in the indicator 530 are displayed in a different way so as to be visually recognized by a user easily. In the example shown in FIG. 1, the display part marking area 531 and the hidden part marking areas 532a and 532b each have a different color.

As explained with reference to FIG. 1, the general indicator 530 is constituted by the display part marking area 531 and the hidden part marking areas 532a and 532b. Accordingly, a user can grasp a positional relation of a part displayed on the display screen 510 with respect to the whole content information set 520 by referring to the position of the display part marking area 531 in the indicator 530. However, the content information set 520 may be updated as needed. Although the indicator 530 is updated in response to the update of the content information set 520, the general indicator 530 does not reflect information on the update of the content information set 520. Accordingly, even if a user refers to the indicator 530, it is difficult to grasp whether the content information set 520 has been updated, and a positional relation of the updated content information piece with respect to the whole content information set 520. Accordingly, the user feels inconvenience of scrolling and displaying content information set 520, checking content information pieces displayed on the display screen 510, and recognizing the update.

The present inventor, etc. have arrived at an update information notification process (to be described later) according to an embodiment of the present disclosure, as a result of studying a configuration capable of further improving convenience of a user in view of a result of considering the general content information set and indicator.

[1-2. Update Information Notification Process According to Present Embodiment]

Figure 2:
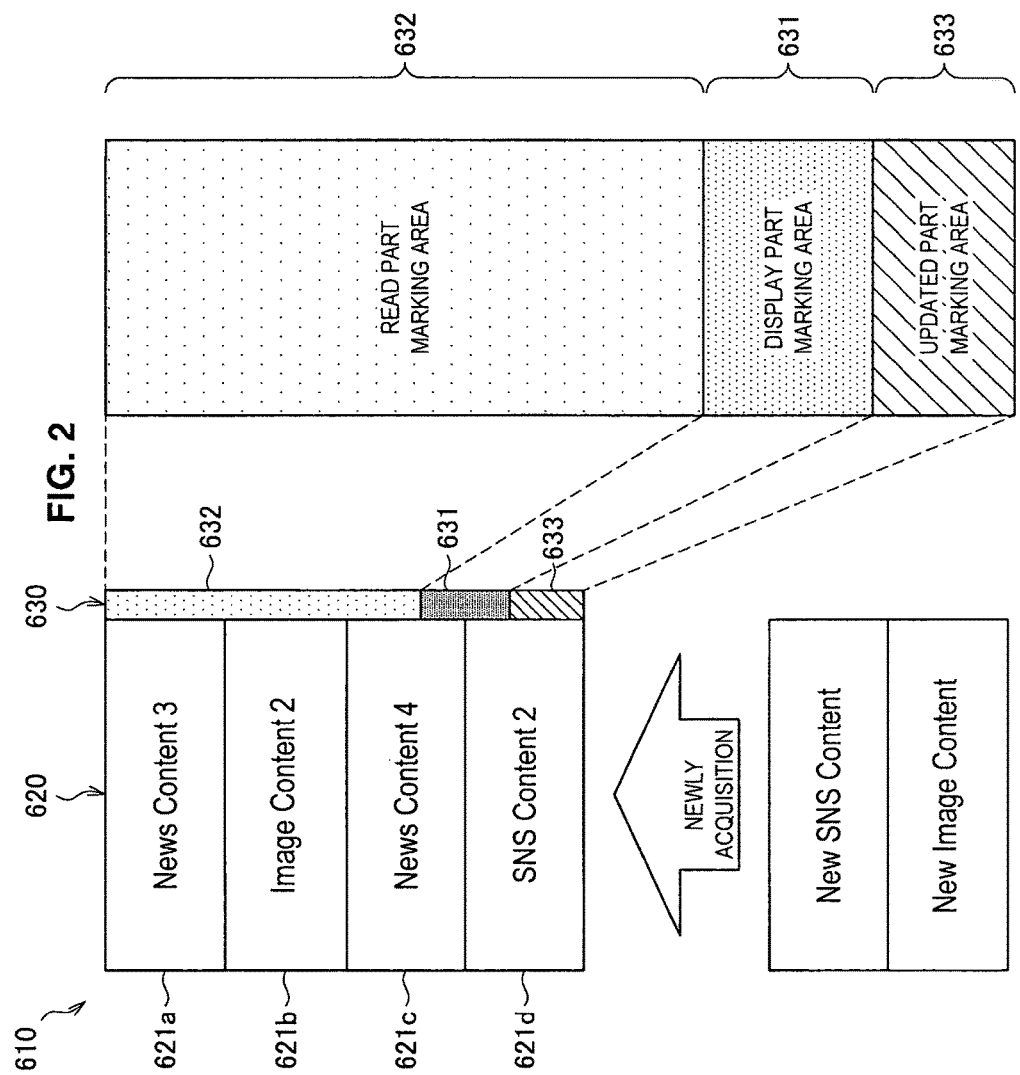
FIG. 2 is a schematic view showing an example of display of a content information set and indicator according to an embodiment of the present disclosure.

With reference to FIG. 2, there is explained an overview of the update information notification process according to an embodiment of the present disclosure. FIG. 2 is a schematic view showing an example of display of a content information set and indicator according to an embodiment of the present disclosure.

With reference to FIG. 2, a content information set 620 according to the present embodiment and an indicator 630 according to the present embodiment are displayed on a display screen 610. In an example shown in FIG. 2, the display screen 610 is divided into two areas. At least a part of the content information set 620 is displayed in one area, and the indicator 630 is displayed in the other area.

The content information set 620 is constituted by content information pieces lined up in a row (list) in a predetermined arrangement sequence. In the example shown in FIG. 2, the display screen 610 displays content information pieces 621a to 621d that are a part of the content information pieces constituting the content information set 620. Note that, hereinafter, a direction in which the content information pieces constituting the content information set 620 are arranged in the display screen 610 (vertical direction of the display screen 610 in the example shown in FIG. 2) is also referred to as a first direction. In addition, in the following explanation, concepts of an upper direction, a lower direction, a left direction, and a right direction are defined with reference to display of the display screen 610.

The content information pieces constituting the content information set 620 may be content information pieces indicating different kinds of various content. For example, with reference to FIG. 2, the content information piece 621a is "News Content 3", the content information piece 621b is "Image Content 2", the content information piece 621c is "News Content 4", and the content information piece 621d is "SNS Content 2". It is possible to scroll and display the content information set 620 on the display screen 610, and change the content information pieces displayed on the display screen 610. In addition, by selecting one of the content information pieces displayed on the display screen 610, it is possible to refer to a detailed content of the content. Specifically, for example, in a case in which the display screen 610 has a so-called touchscreen function, display of the content information set 620 is scrolled upward and downward by moving an operation body on the content information set 620 in the first direction that is an arrangement direction thereof, in other words, in a vertical direction in the example shown in FIG. 2, and the content information pieces displayed on the display screen 610 change. In addition, when the operation body taps one of the content information pieces included in the content information set 620, an application for playing or browsing corresponding content may be activated, and a detailed content of the content may be displayed on the display screen 510. Note that, drag and tap using the operation body may be drag and click using a cursor operated by a mouse, for example.

In the present embodiment, the content information set 620 may be updated as needed. Here, in the present embodiment, the "update" may mean change in the number or kinds of the content information pieces constituting the content information set 620, or may mean change in contents of the content information pieces constituting the content information set 620. The updated content information piece from among the content information pieces constituting the content information set 620 may be the content information piece that has never been displayed on the display screen, in other words, the content information piece that has never been visually recognized by the user. In addition, in the present embodiment, a content information piece displayed on the display screen 610 at least once from among the content information pieces constituting the content information set 620 may be referred to as a content information piece that has been read by the user, and a content information piece that has never been displayed on the display screen 610 may be referred to as a content information piece unread by the user.

In the present embodiment, a configuration of the indicator 630 is different from that of the general indicator 530 shown in FIG. 1. Specifically, the indicator 630 according to the present embodiment displays information on update of the content information set 620.

There are explained details of the configuration of the indicator 630 according to the present embodiment. Like a bird's eye view, the indicator 630 indicates a positional relation of a part of the content information set 620 with respect to the whole content information set 620, the part being displayed on the display screen 610. In the example shown in FIG. 2, the indicator 630 is a so-called scroll indicator and has a linear shape stretching on the display screen 610 in the first direction that is the arrangement direction of the content information set 620, in other words, in the vertical direction of the display screen 610. The indicator 630 includes a display part marking area 631, a read part marking area 632, and an updated part marking area 633, the display part marking area 631 indicating a part (hereinafter, also referred to as a display part) displayed on the display screen 610 from among the content information set 620, the read part marking area 632 indicating a part that is not updated or not displayed on the display screen 510 (for example, a part corresponding to a content information piece read by a user. Hereinafter, the part is also referred to as a hidden part or a read part) from among the content information set 620, and the updated part marking area 633 indicating a part (hereinafter, also referred to as an updated part) corresponding to an updated content information piece from among the content information set 620. In response to scrolling of display of the content information set 620, a position of the display part marking area 631 in the indicator 630 changes in real time.

The entire length of the indicator 630 corresponds to the entire length (quantity) of the content information set 620. The display part marking area 631, the read part marking area 632, and the updated part marking area 633 respectively represent positional relations and quantity of the display part, the read part, and the updated part with respect to the whole content information set 620. In the right side of FIG. 2, the enlarged indicator 630 is shown, and respective areas in the indicator 630 are conceptually shown. The display part marking area 631, the read part marking area 632, and the updated part marking area 633 in the indicator 630 are displayed in a different way so as to be visually recognized by a user easily. In the example shown in FIG. 2, there is displayed the display part marking area 631, the read part marking area 632, and the updated part marking area 633 each of which have a different color. Note that, in the present embodiment, a method for displaying respective areas in the indicator 630 in a different way is not limited to giving different colors to the areas, and any display method can be applied. For example, in the indicator 630, the display part marking area 631, the read part marking area 632 and the updated part marking area 633 each may have a different shape. The respective areas each have a different shape, for example, by making thicknesses and shapes of frames forming the areas different from each other.

Here, a case in which the content information set 620 is updated is considered. For example, as shown in FIG. 2, a new SNS content information piece and a new image content information piece are newly acquired, and these content information pieces are added to the content information set 620. When the new content information pieces are added to the content information set 620, the number of content information pieces constituting the content information set 620 is increased, and quantity of the whole content information set 620 changes. Therefore, the indicator 630 is regenerated in response to the change in the quantity. As described above, when the indicator 630 is generated in the present embodiment, the updated part marking area 633 is generated to be displayed in a way different from the other part including the display part marking area 631 and the read part marking area 632, the updated part marking area 633 indicating the update part corresponding to the content information pieces newly added to the content information set 620. Accordingly, the user who refers to the indicator 630 on the display screen 610 can recognize that the content information set 620 has been updated, and can recognize where the updated part is in the content information set 620 (in other words, which position the newly acquired content information pieces have been added to in the content information set 620). In the example shown in FIG. 2, the newly acquired SNS content information piece and image content information piece are added to an end of the content information set 620 (an end in the lower direction of the display screen 610), and the updated part marking area 633 is formed at the lowest side of the indicator 630 in response to the update of the content information set 620.

Here, as explained above, in a case in which the general existing indicator 530 shown in FIG. 1 is updated in response to update of the content information set 520, it is difficult for a user to grasp whether the content information set 520 has been updated and a positional relation of the updated content information piece with respect to the whole content information set 520, simply by referring to the indicator 530. On the other hand, the indicator 630 according to the present embodiment includes the updated part marking area 633 indicating the updated part of the content information set 620. Accordingly, the user can quickly grasp a position of the updated part with respect to the whole content information set 620 by referring to the indicator 630, and can quickly access the updated part by scrolling the display of the content information set 620 on the display screen 610, for example. Therefore, convenience of the user can be further improved. Note that, in the present embodiment, a part displayed on the display screen 610 from among the updated part may be regarded as a read part that has been already referred to by the user. In addition, in response to the change from the updated part to the read part, it may be possible to change display of the read part marking area 632 and the updated part marking area 633 in the indicator 630

(for example, a quantity ratio of the read part marking area 632 and the updated part marking area 633 to the whole indicator 630). In this way, since the display of the indicator 630 changes in real time in response to the change in the updated part, the user can acquire the positional information of the unread content information piece in the content information set 620 as needed from the display of the indicator 630. Therefore, convenience of the user can be further improved.

As explained with reference to FIGS. 1 and 2, in the present embodiment, convenience of the user can be further improved by reflecting information on update of the content information set 620 to the indicator 630. Next, there is explained a configuration example of an information processing apparatus capable of executing the update information notification process according to the present embodiment.

<2. Configuration of Information Processing Apparatus>

Figure 3:
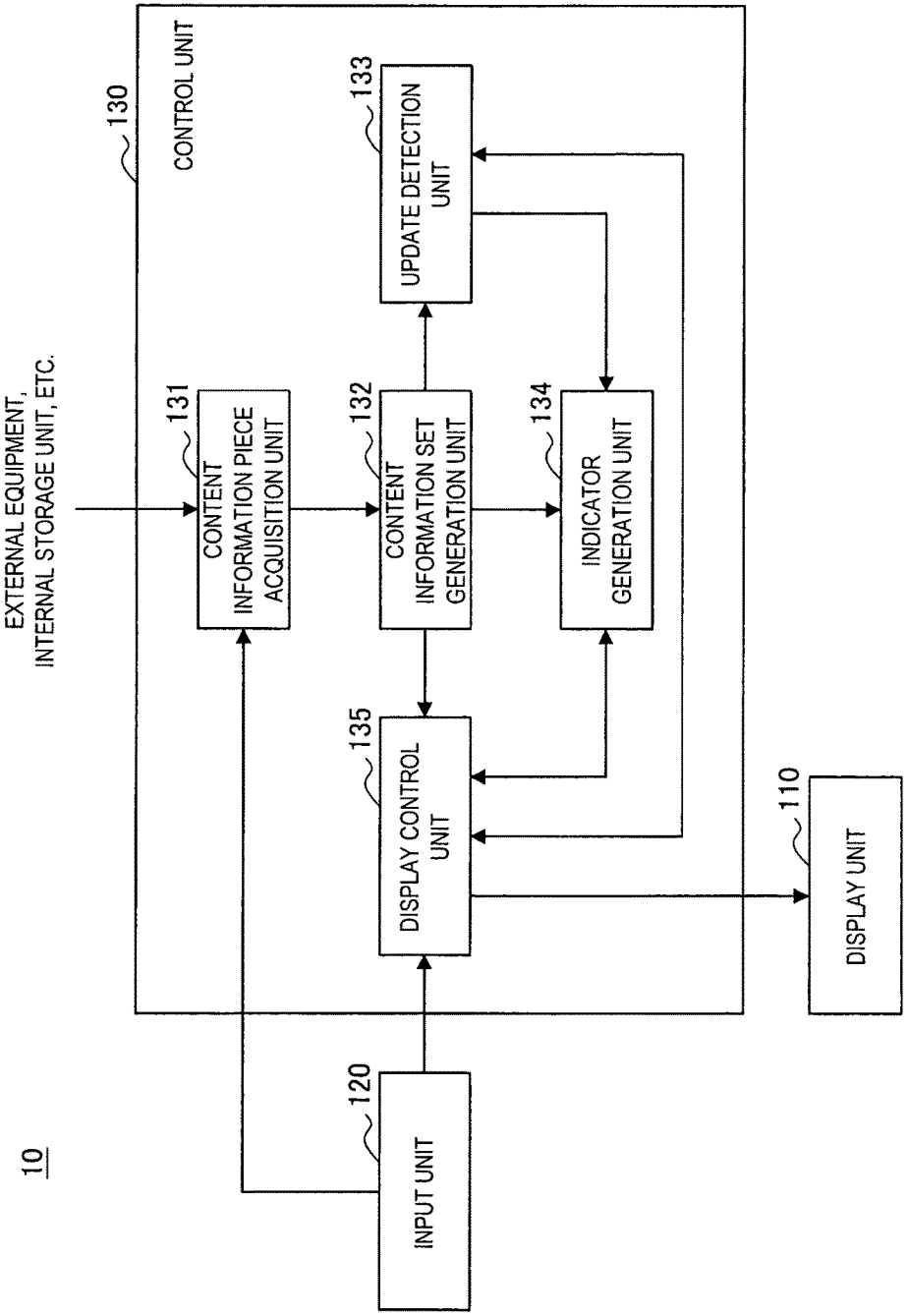
FIG. 3 is a functional block diagram showing a configuration example of an information processing apparatus according to an embodiment of the present disclosure.

With reference to FIG. 3, there is explained a configuration example of an information processing apparatus 10 according to an embodiment of the present disclosure. FIG. 3 is a functional block diagram showing a configuration example of the information processing apparatus 10 according to an embodiment of the present disclosure. Note that, in the following explanation, an information processing apparatus having a touchscreen such as a smartphone or a tablet PC is used as an example of the information processing apparatus 10.

With reference to FIG. 3, the information processing apparatus 10 according to the present embodiment includes a display unit 110, an input unit 120, and a control unit 130.

The display unit 110 is an example of an output means that visually outputs various kinds of information to a user in any format such as text, graph, and image. For example, the display unit 110 is constituted by the display apparatus, and notifies a user of various kinds of information by displaying the information on a display screen of the display apparatus. In the present embodiment, a display control unit 135 (to be described later) in the control unit 130 controls driving of the display unit 110. As shown in FIG. 2, the display screen displays at least a part of the content information set 620 according to the present embodiment and the indicator 630 according to the present embodiment. In addition, when any of content information pieces constituting the content information set 620 is selected, the display unit 110 may display detailed information of the selected content on the display screen. The information displayed on the display screen of the display unit 110 is not limited such example. Various kinds of information to be processed in any known application executed by the information processing apparatus 10 may be displayed.

The input unit 120 is an example of an operation means operated by a user for inputting various kinds of information, instructions on the process, and the like to the information processing apparatus 10. For example, the input unit 120 includes the operation means such as a mouse, a keyboard, a touchscreen, a button, and a switch. In the information processing apparatus 10 according to the present embodiment, a touchscreen is formed by integrating the display unit 110 with the input unit 120. Accordingly, a movement of the operation body on the display screen of the display unit 110 corresponds to input of various kinds of information, instructions, and the like via the input unit 120. For example, as an operation input via the input unit 120, the movement of the operation body on the display screen of the display unit 110 may be inputted to the display control unit 135 (to be described later) of the control unit 130, and display on the display unit 110 may be controlled. Specifically, the operation body moves in an arrangement direction of a content information set on the content information set displayed on the display screen of the display unit 110, display of the content information set is scrolled, and content information pieces displayed on the display screen are changed. In addition, when the operation body taps one of the content information pieces included in the content information set displayed on the display screen of the display unit 110, an application for playing or browsing corresponding content may be activated, and a detailed content of the content may be displayed on the display screen. In addition, the information processing apparatus 10 may update a content information set in response to an operation input from the input unit 120.

The control unit 130 includes a content information piece acquisition unit 131, a content information set generation unit 132, the update detection unit 133, an indicator generation unit 134, and the display control unit 135.

The content information piece acquisition unit 131 acquires a content information piece constituting a content information set according to the present embodiment. In the present embodiment, a method by which the content information piece acquisition unit 131 acquires a content information piece is not uniquely limited. The content information piece acquisition unit 131 can acquire the content information piece by using any method. For example, the content information piece acquisition unit 131 may acquire the content information piece from another external equipment connected to the information processing apparatus 10 via a communication network (network), or may acquire the content information piece from an internal storage unit (not shown) in the information processing apparatus 10. In addition, the content information piece acquisition unit 131 may automatically acquire the content information piece at a predetermined timing, or may acquire the content information piece at a timing according to a predetermined operation input performed by a user via the input unit 120. The content information piece acquisition unit 131 transmits the acquired content information piece to the content information set generation unit 132.

On the basis of the content information pieces acquired by the content information piece acquisition unit 131, the content information set generation unit 132 generates a content information set including a series of the content information pieces in a predetermined arrangement sequence, the content information pieces being displayed in a predetermined area on the display screen of the display unit 110. The content information set corresponds to the content information set 620 shown in FIG. 2, for example. In addition, the content information set generation unit 132 can newly generate (update) a content information set by adding a content information piece newly acquired by the content information piece acquisition unit 131 to an already generated content information set. In the present embodiment, the update of the content information set means addition of the newly acquired content information piece (that is, newly arrived information) to the content information set. When the content information set generation unit 132 updates the content information set, the number of content information pieces constituting the content information set may be increased by the newly acquired content information piece, or contents of the content information pieces constituting the already generated content information set may be changed.

The arrangement sequence of the content information pieces in the content information set according to the present embodiment may be an order the content information pieces have been updated, in other words, an order the content information piece acquisition unit 131 has acquired the content information pieces, for example. However, the arrangement sequence of the content information set according to the present embodiment is not limited thereto. In the content information set, the content information pieces may be arranged in any order. For example, in the content information set, content information pieces of a same kind may be grouped and arranged in the group unit. Alternatively, content information pieces having related contents (for example, content information pieces relating to messages or comments posted by the same person in an SNS content) may be grouped on the basis of the contents of the content and may be arranged in the group unit. The content information set generation unit 132 transmits information on the generated content information set to the update detection unit 133, the indicator generation unit 134, and the display control unit 135.

The update detection unit 133 detects an updated content information piece from among the content information pieces constituting the content information set generated by the content information set generation unit 132. Specifically, the update detection unit 133 detects, as the updated content information piece, the content information piece newly added to the content information set by the content information set generation unit 132 from among the content information pieces constituting the content information set. In the content information set according to the present embodiment, a content information piece displayed on the display screen of the display unit 110 at least once may be regarded as a content information piece visually recognized by a user (in other words, a content information piece that has been read by the user). Accordingly, the update detection unit 133 detects, as the updated content information piece, the content information piece that has never been displayed on the display screen of the display unit 110 from among the content information pieces constituting the content information set. Specifically, the update detection unit 133 can detect the updated content information piece by acquiring information on whether the content information piece is displayed on the display screen from the display control unit 135 that controls display on the display screen of the display unit 110. The update detection unit 133 transmits information on the updated content information piece that has been detected to the indicator generation unit 134.

On the basis of the information on the content information set generated by the content information set generation unit 132 and the information on the updated content information piece detected by the update detection unit 133, the indicator generation unit 134 generates an indicator indicating at least a positional relation of an updated part with respect to the whole content information set, the updated part corresponding to the updated content information piece from among the content information set. The indicator corresponds to the indicator 630 shown in FIG. 2, for example. As explained with reference to FIG. 2, the indicator according to the present embodiment is constituted by: the display part marking area that indicates a positional relation of a display part with respect to the whole content information set, the display part corresponding to the content information piece displayed on the display screen from among the content information set; the updated part marking area that indicates a positional relation of the updated part with respect to the whole content information set; and the read part marking area (or a hidden part marking area) that indicates a positional relation of a read part (or a hidden part) with respect to the whole content information set, the read part (or the hidden part) corresponding to the content information piece that is not included in the display part or the updated part from among the content information set. Subsequently, the indicator generation unit 134 can generate the indicator so that the display part marking area, the updated part marking area, and the read part marking area are displayed in a different way. For example, the indicator generation unit 134 may generate the indicator so that the display part marking area, the updated part marking area, and the read part marking area each have a different color. Alternatively, for example, the indicator generation unit 134 may generate the indicator so that the display part marking area, the updated part marking area, and the read part marking area each have a different shape.

The indicator generation unit 134 may generate an indicator having a linear shape stretching in the first direction that is a direction in the arrangement sequence when the content information set is displayed on the display screen of the display unit 110. In the case in which the indicator has the linear shape, the entire length of the indicator corresponds to the entire length (quantity) of the content information set, and the display part marking area, the updated part marking area, and the read part marking area respectively represent positional relations and quantity of the display part, the updated part, and the read part with respect to the whole content information set. Specifically, the indicator generation unit 134 can generate the indicator so that a size of the display part marking area reflects a ratio of the number of the content information pieces constituting the display part to the total number of the content information pieces constituting the content information set, a size of the updated part marking area reflects a ratio of the number of the content information pieces constituting the updated part to the total number of the content information pieces constituting the content information set, and a size of the read part marking area reflects a ratio of the number of the content information pieces constituting the read part to the total number of the content information pieces constituting the content information set.

On the basis of the information on the content information set transmitted from the content information set generation unit 132, the indicator generation unit 134 can acquire the information on the total number of the content information pieces constituting the content information set. In addition, on the basis of the information on the updated content information piece transmitted from the update detection unit 133, the indicator generation unit 134 can acquire information necessary to form the updated part marking area. In addition, the indicator generation unit 134 can acquire information necessary to form the display part marking area and the read part marking area by acquiring the information on whether the content information piece is displayed on the display screen from the display control unit 135 that controls display on the display screen of the display unit 110. As explained above, the indicator generation unit 134 can generate the indicator on the basis of the various kinds of information acquired by the content information set generation unit 132, the update detection unit 133, and the display control unit 135.

The indicator generation unit 134 transmits information on the generated indicator to the display control unit 135.

The display control unit 135 controls display on the display screen of the display unit 110 by controlling driving of the display unit 110. In the present embodiment, the display control unit 135 displays the indicator generated by the indicator generation unit 134 on the display screen, while displaying at least a part of the content information set on the display screen in the arrangement sequence, the content information set generated by the content information set generation unit 132. For example, as shown in FIG. 2, the display control unit 135 divides the display screen of the display unit 110 into two areas, displays at least a part of the content information set on one area, and displays the indicator on the other area so as to display the indicator and at least a part of the content information set in parallel on the display screen. Note that, in the present embodiment, it is only necessary to display the indicator and at least a part of the content information set together on the display screen. The method for displaying them by the display control unit 135 is not limited to such example. For example, the display control unit 135 may overlay and display the indicator on at least a part of the content information set in the display screen of the display unit 110. In addition, the display control unit 135 may not always display the indicator in the display screen of the display unit 110, but only when a predetermined operated is input (for example, when an operation for scrolling and displaying the content information set is input).

In addition, the display control unit 135 is configured to control display on the display screen of the display unit 110, and therefore can acquire information on a thing displayed on the display screen of the display unit 110. Specifically, the display control unit 135 can acquire information for specifying a content information piece displayed on the display screen of the display unit 110 at least once and a content information piece that has never been displayed on the display screen of the display unit 110 from among the content information pieces constituting the content information set. In the present embodiment, the display control unit 135 transmits such information on the thing displayed on the display screen of the display unit 110 to the update detection unit 133 and the indicator generation unit 134. The update detection unit 133 and the indicator generation unit 134 can determine an unread part and a read part in the content information set on the basis of the transmitted information.

Note that, a specific example of display performed by the display control unit 135 on the display screen of the display unit 110 is explained more specifically in the following <3. Specific Example of Update Information Notification Process>.

With reference to FIG. 3, there has been explained the example of the functions of the information processing apparatus 10 according to the present embodiment. Each of the structural elements described above may be configured by using a general purpose component or circuit or may be configured by hardware specialized for the function of each of the structural elements. Alternatively, a CPU or the like may achieve all of the functions of the structural elements. Thus, it is possible to appropriately modify a configuration to be used in accordance with technical levels at a time when the present embodiment is implemented.

As explained above, according to the present embodiment, the content information set generation unit 132 generates a content information set including a series of content information pieces in a predetermined arrangement sequence, and the display control unit 135 displays a part of the content information set on the display screen in the arrangement sequence, the content information pieces being displayed in a predetermined area on a display screen. In addition, the update detection unit 133 detects an updated content information piece from among the content information set, and the indicator generation unit 134 generates an indicator indicating at least a positional relation of an updated part with respect to the whole content information set, the updated part corresponding to the updated content information piece from among the content information set. Subsequently, the display control unit 135 displays the indicator together with the part of the content information set on the display screen. Accordingly, by referring to the indicator, the user can quickly grasp a position of the updated part with respect to the whole content information set, and can quickly access the updated part. Therefore, convenience of the user can be further improved.

Note that, in the present embodiment, a part displayed on the display screen from among the updated part may be regarded as a read part that has been already referred to by the user. In addition, in response to the change from the updated part to the read part in the content information set, it may be possible to change display of the read part marking area and the updated part marking area in the indicator as needed. In this way, since the display of the indicator changes in real time in response to the change in the updated part, the user can acquire the positional information of the unread content information piece in the content information set as needed from the display of the indicator. Therefore, convenience of the user can be further improved.

<3. Specific Example of Update Information Notification Process>

Figure 4:
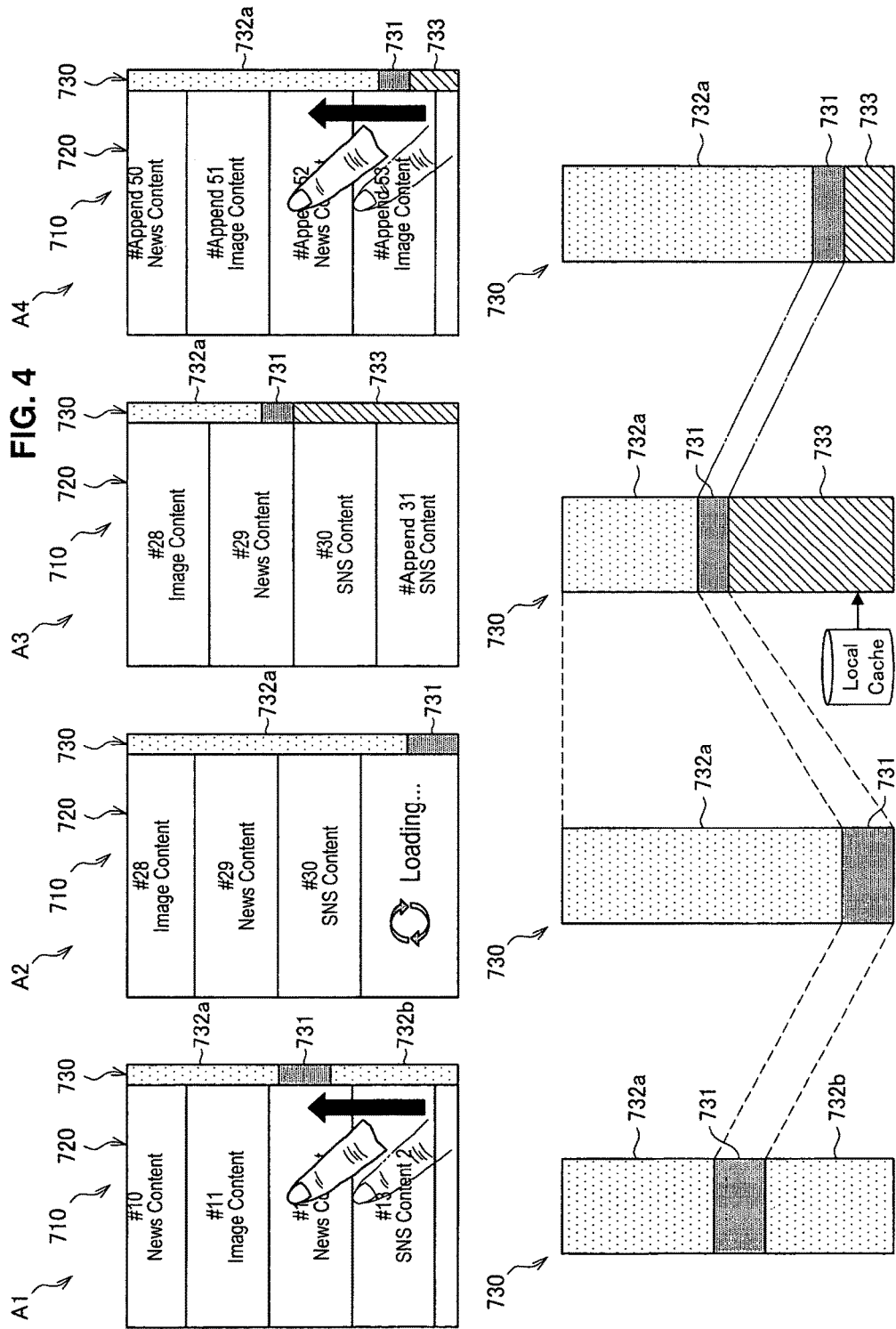
FIG. 4 is an explanatory diagram illustrating a first specific example of an update information notification process according to the embodiment.
Figure 5:
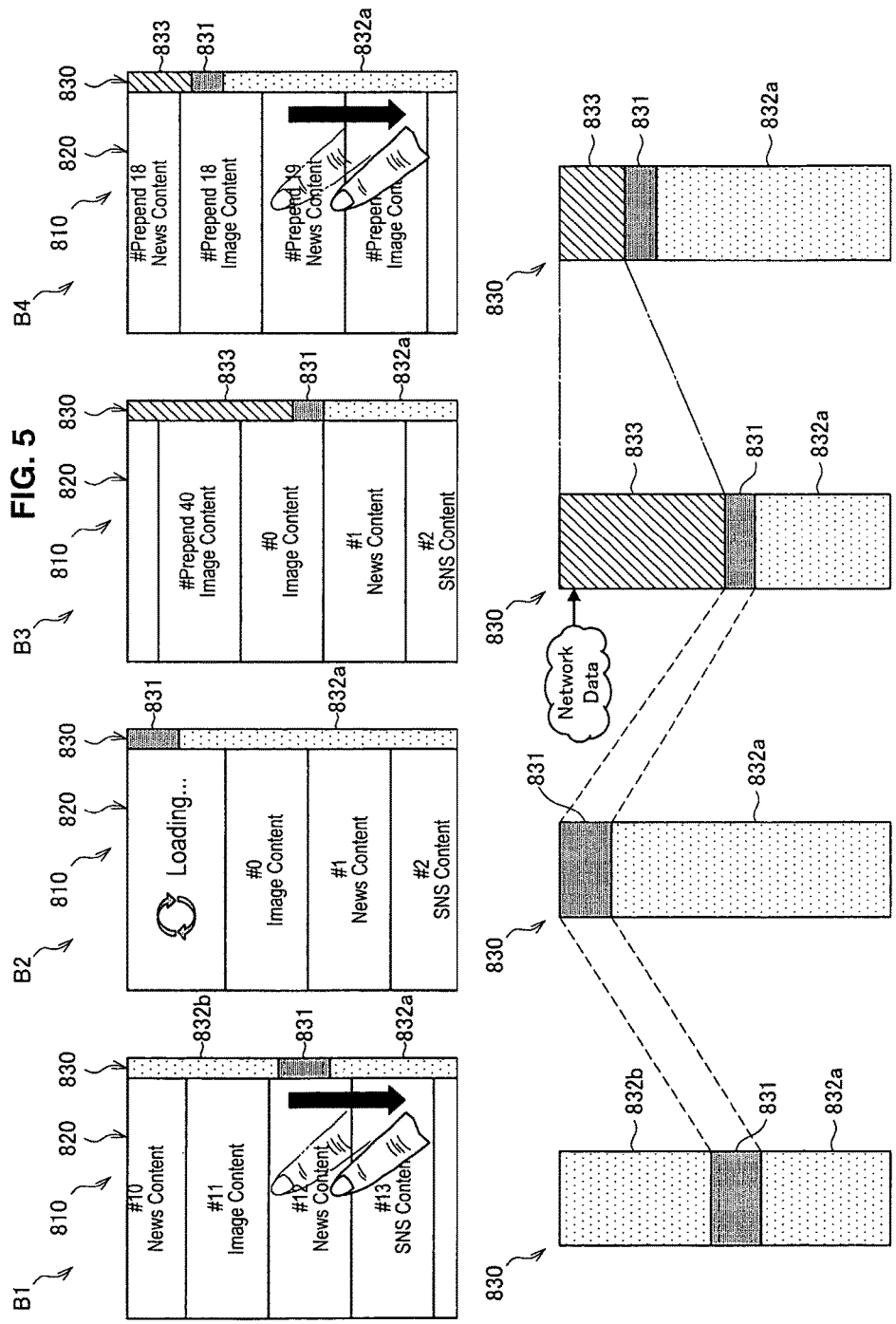
FIG. 5 is an explanatory diagram illustrating a second specific example of the update information notification process according to the embodiment.
Figure 6:
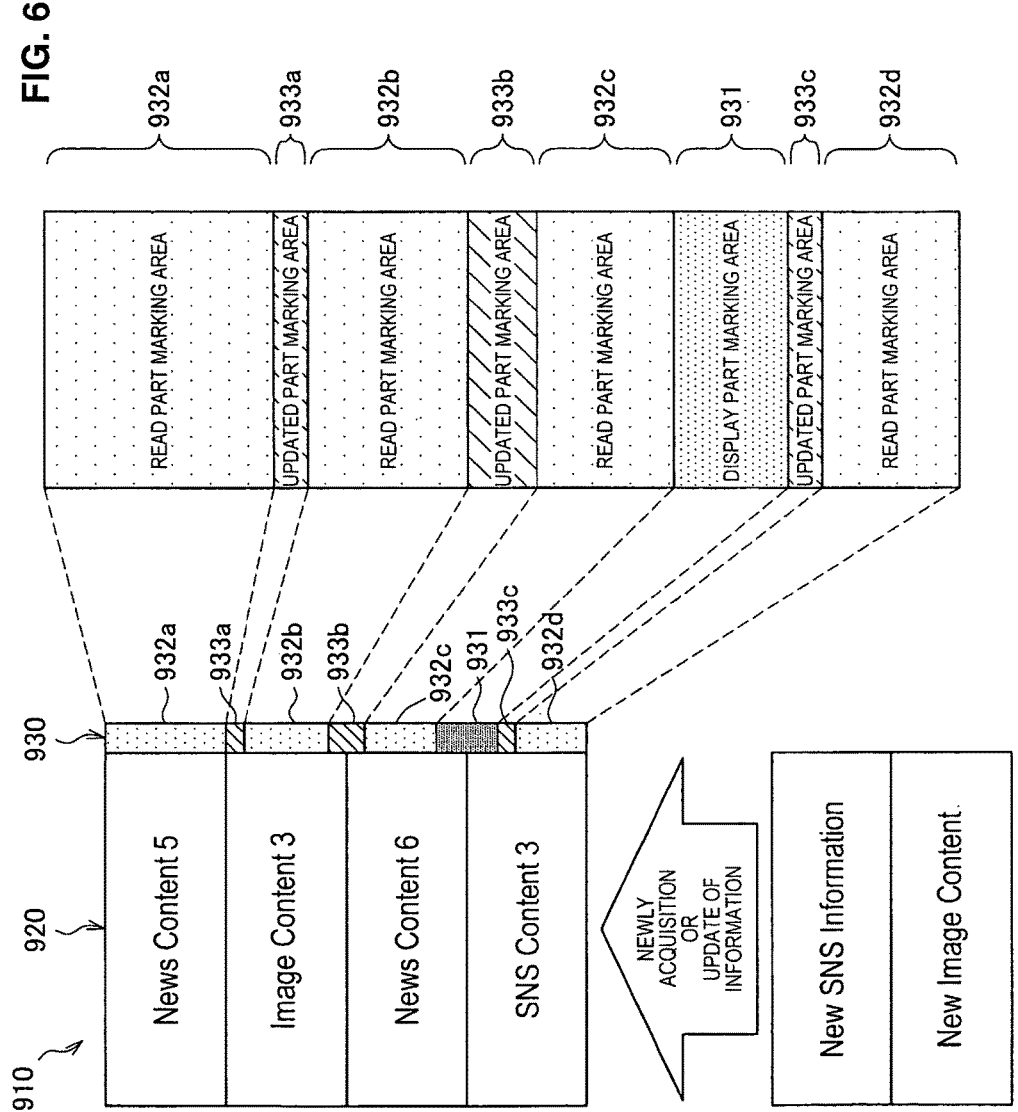
FIG. 6 is an explanatory diagram illustrating a third specific example of the update information notification process according to the embodiment.

Next, with reference to FIGS. 4, 5, and 6, there is explained a specific example of the update information notification process according to the embodiment of the present disclosure while showing a display example of the display screen of the display unit 110. Note that, in the following explanation of the specific example of the update information notification process, various kinds of processes in the update information notification process are explained in association with functions of the structural elements of the information processing apparatus 10 shown in FIG. 3.

[3-1. First Specific Example]

First, with reference to FIG. 4, there is explained a first specific example of the update information notification process according to the present embodiment. FIG. 4 is an explanatory diagram illustrating a first specific example of the update information notification process according to the embodiment.

FIG. 4 shows a display screen 710 in a series of processes in which the content information piece acquisition unit 131 acquires content information pieces, the content information set generation unit 132 generates a content information set, the update detection unit 133 detects updated content information pieces from among the content information set, and the indicator generation unit 134 generates an indicator. Note that, the display screen 710 corresponds to the display screen of the display unit 110 shown in FIG. 3, and display on the display screen is controlled by the display control unit 135. In an upper side of FIG. 4, the display screen 710 is shown. In a lower side of FIG. 4, the enlarged indicator displayed on the display screen 710 is shown.

With reference to FIG. 4, first, in Step A1, a content information set 720 and an indicator 730 are shown on the display screen 710. The content information set 720 has a configuration similar to that of the content information set 620 according to the present embodiment shown in FIG. 2. The content information set 720 is constituted by content information pieces lined up in a row (list) in a predetermined arrangement sequence. In the example shown in FIG. 4, the arrangement sequence is an order the content information piece acquisition unit 131 has acquired content information pieces (in other words, an order the content information pieces have been updated). In the content information set 720, content information pieces are arranged in a manner that a latest acquired content information piece is positioned at the bottom of the display screen 710 in the vertical direction.

In Step A1, a part of the content information pieces constituting the content information set 720 including "#10 News Content", "#11 Image Content", "#12 News Content", and "#13 SNS Content" is displayed on the display screen 710. The display screen 710 is integrated with the input unit 120 shown in FIG. 3 and has a touchscreen function. Accordingly, as shown in FIG. 4, the user can scroll and display the content information set 720 by moving (dragging) the operation body (for example, a finger) on the display screen 710 in the vertical direction that is a direction of the arrangement sequence of the content information set 720. In Step A1 in FIG. 4, the display of the content information set 720 is scrolled and displayed from bottom to top by moving the finger from bottom to top on the display screen 710.

The indicator 730 has a configuration similar to that of the indicator 630 according to the present embodiment shown in FIG. 2. In the example shown in FIG. 4, a situation of Step A1 is a situation in which content information pieces constituting the content information set 720 have already been displayed on the display screen 710 at least once (in other words, the content information pieces have been referred to by the user at least once). Accordingly, the indicator 730 is constituted by a display part marking area 731 indicating a display part serving as a part displayed on the display screen 710 from among the content information set 720, and read part marking areas 732a and 732b indicating read parts serving as parts that are not updated or not displayed on the display screen 710 from among the content information set 720.

Step A2 shows a situation in which the user has scrolled the display of the content information set 720 in the upper direction under the situation shown in Step A1, and the display has been scrolled to the end of the content information set 720. In response to the scroll of the display of the content information set 720, the display of the indicator 730 changes in a manner that the display part marking area 731 positions at the lowest part of the indicator 730 and the other areas becomes the read part marking area 732a (in other words, length of the read part marking area 732a (length in the vertical direction of the display screen 710) is lengthened).

Here, in the first specific example shown in FIG. 4, the content information piece acquisition unit 131 newly acquires content information pieces, the acquisition being triggered when the display has been scrolled to the end of the content information set 720. Specifically, in the first specific example, the input unit 120 inputs, to the content information piece acquisition unit 131, information indicating that the display has been scrolled to the end of the content information set 720. Subsequently, the content information piece acquisition unit 131 acquires content information pieces, the acquisition being triggered by the input of the information. As shown in FIG. 4, a text such as "Loading" indicating that content is being acquired may be displayed on the display screen 710, while the display has been scrolled to the end of the content information set 720 and the content information piece acquisition unit 131 is newly acquiring the content information pieces. Note that, in the present embodiment, a timing when the content information piece acquisition unit 131 acquires the content information piece is not limited thereto. The content information piece acquisition unit 131 may periodically acquire the content information piece at a predetermined timing, or may acquire the content information piece by using another predetermined operation input by the input unit 120 as a trigger.

Step A3 shows a situation in which content information piece acquisition unit 131 newly acquires content information pieces after the situation shown in Step A2, and the content information set generation unit 132 and the indicator generation unit 134 newly generates the content information set 720 and the indicator 730 on the basis of the acquired content information pieces. In the example shown in FIG. 4, the content information piece acquisition unit 131 acquires the content information pieces from cache memory in an internal storage unit of the information processing apparatus 10. Note that, in the present embodiment, the acquisition source from which the content information piece acquisition unit 131 acquires a content information piece is not limited thereto. For example, the content information piece acquisition unit 131 may acquires the content information pieces from another external equipment connected via a network.

In the situation shown in Step A3, the content information set 720 is updated since the content information piece acquisition unit 131 newly acquires the content information pieces. Specifically, the newly acquired content information pieces are added to the lowest side of the content information set 720 in the arrangement sequence. In the example shown in FIG. 4, "#Append 31 SNS Content" that is one of newly acquired content information pieces is displayed as a part of the content information set 720 on the display screen 710.

In the situation shown in Step A3, the indicator 730 is also updated in response to the update of the content information set 720. Specifically, length of the display part marking area 731 and the read part marking area 732a is shortened due to increase in the total number of the content information pieces constituting the content information set 720. This is because the ratio of the number of content information pieces constituting the display part and the read part to the total number of content information pieces constituting the content information set 720 becomes smaller due to the update of the content information set 720. Note that, in the situation of Step A3, the content information pieces that have been newly added to the content information set 720 have never been displayed on the display screen 710 (in other words, the content information pieces have never been referred to by the user). Accordingly, the indicator 730 includes the updated part marking area 733 indicating the updated part corresponding to the updated content information pieces from among the content information set 720. Note that, the indicator generation unit 134 can receive information on the display part and the read part of the content information set 720 from the display control unit 135, receive information on the updated part of the content information set 720 from the update detection unit 133, and generate the indicator 730 on the basis of such information.

Step A4 shows a situation in which the user has scrolled and displayed the display of the content information set 720 in the upper direction under the situation shown in Step A3. In the example shown in FIG. 4, a part of the content information pieces that has been newly added in Step A3 is displayed on the display screen 710 due to the scroll of the display of the content information set 720, the part including "#Append 50 News Content", "#Append 51 Image Content", "#Append 52 News Content", and "#Append 53 Image Content".

Here, in the present embodiment, a content information piece displayed on the display screen 710 at least once is regarded as a content information piece that has been referred to once by the user. Accordingly, as shown by the situation of Step A4 in FIG. 4, display of the indicator 730 changes in accordance with the scrolling and displaying of the content information set 720. Specifically, the content information piece belonging to the updated part changes to the content information piece belonging to the display part, and subsequently the content information piece belonging to the display part changes to the content information piece belonging to the read part in accordance with scrolling and displaying of the content information set 720. Therefore, the length of the read part marking area 732a in the indicator 730 is lengthened, and the length of the updated part marking area 733 is shortened. In this way, the indicator generation unit 134 can acquire information on the display part, the read part, and the updated part of the content information set 720 from the display control unit 135 or the update detection unit 133 every time the display of the display screen 710 changes, and can generate the indicator 730 as needed on the basis of such information.

With reference to FIG. 4, there has been explained the first specific example of the update information notification process according to the present embodiment.

[3-2. Second Specific Example]

Next, with reference to FIG. 5, there is explained a second specific example of the update information notification process according to the present embodiment. FIG. 5 is an explanatory diagram illustrating a second specific example of the update information notification process according to the present embodiment. Note that, the second specific example of the update information notification process shown in FIG. 5 corresponds to a case in which an arrangement direction of the content information set 720 on the display screen 710 is opposite to that of the first specific example shown in FIG. 4, and an acquisition source from which the content information piece acquisition unit 131 acquires content information pieces is different from that of the first specific example. Processes other than that are similar to those of the first specific example. In the following explanation about the second specific example, differences from the first specific example are mainly explained, and detailed explanations about overlapping configuration, function, and the like are omitted.

FIG. 5 shows a display screen 810 in a series of processes in which the content information piece acquisition unit 131 acquires content information pieces, the content information set generation unit 132 generates a content information set, the update detection unit 133 detects updated content information pieces from among the content information set, and the indicator generation unit 134 generates an indicator. Note that, the display screen 810 corresponds to the display screen 710 in the first specific example shown in FIG. 4. In an upper side of FIG. 5, the display screen 810 is shown. In a lower side of FIG. 5, the enlarged indicator displayed on the display screen 810 is shown.

With reference to FIG. 5, in Step B1, a content information set 820 and an indicator 830 are shown on the display screen 810. The content information set 820 and the indicator 830 correspond to the content information set 720 and the indicator 730 in the first specific example shown in FIG. 4. However, in the content information set 820, an arrangement direction of display on the display screen 810 is opposite to the arrangement direction of display of the content information set 720 in the first specific example. In the content information set 820, content information pieces are arranged in a row (list) in a manner that a latest acquired content information piece is positioned at the top of the display screen 810 in the vertical direction. In Step B1 in FIG. 5, the display of the content information set 820 is displayed and scrolled from the top to bottom by moving the finger from the top to bottom on the display screen 810 in accordance with the arrangement direction.

Such as the indicator 730, the indicator 830 is constituted by a display part marking area 831 indicating a display part serving as a part displayed on the display screen 810 from among the content information set 820, and read part marking areas 832a and 832b indicating read parts serving as parts that are not updated or not displayed on the display screen 810 from among the content information set 820.

Step B2 shows a situation in which the user has scrolled the display of the content information set 820 in the lower direction under the situation shown in Step B1, and the display has been scrolled to the end of the content information set 820. In response to the scroll of the display of the content information set 820, the display of the indicator 830 changes in a manner that the display part marking area 831 positions at the uppermost part of the indicator 830 and the other areas becomes the read part marking area 832a (in other words, length of the read part marking area 832a is lengthened).

Here, in the second specific example shown in FIG. 5, the content information piece acquisition unit 131 newly acquires content information pieces, the acquisition being triggered when the display has been scrolled to the end of the content information set 820 in a way similar to the first specific example. As shown in FIG. 5, a text such as "Loading" indicating that content is being acquired may be displayed on the display screen 810, while the display has been scrolled to the end of the content information set 820 and the content information piece acquisition unit 131 is newly acquiring the content information pieces. Note that, also in the second specific example, a timing when the content information piece acquisition unit 131 acquires the content information piece is not limited thereto, in a way similar to the first specific example. The content information piece acquisition unit 131 may periodically acquire the content information piece at a predetermined timing, or may acquire the content information piece by using another predetermined operation input by the input unit 120 as a trigger.

Step B3 shows a situation corresponding to that in Step A3 in FIG. 4. In other words, Step B3 shows a situation in which content information piece acquisition unit 131 newly acquires content information pieces after the situation shown in Step B2, and the content information set generation unit 132 and the indicator generation unit 134 newly generate the content information set 820 and the indicator 830 on the basis of the acquired content information pieces. Note that, in contrast to the example of FIG. 4, the example of FIG. 5 shows a case in which the content information piece acquisition unit 131 acquires the content information pieces from another external equipment connected to the information processing apparatus 10 via a network (for example, external equipment in cloud).

In the situation shown in Step B3, the content information set 820 is updated since the content information piece acquisition unit 131 newly acquires the content information pieces. Specifically, the newly acquired content information pieces are added to the upper side of the content information set 820 in the arrangement sequence. In the example shown in FIG. 5, "#Prepend 40 Image Content" that is one of newly acquired content information pieces is displayed as a part of the content information set 820 on the display screen 810.

In the situation shown in Step B3, the indicator 830 is also updated in response to the update of the content information set 820. Specifically, in a way similar to the first specific example, length of the display part marking area 831 and the read part marking area 832a is shortened due to increase in the total number of the content information pieces constituting the content information set 820. In addition, the updated part marking area 833 is added to the indicator 830, the updated part marking area 833 indicating the updated part corresponding to the updated content information pieces from among the content information set 820. Note that, the indicator generation unit 134 can receive information on the display part and the read part of the content information set 820 from the display control unit 135, receive information on the updated part of the content information set 820 from the update detection unit 133, and generate the indicator 830 on the basis of such information.

Step B4 shows a situation in which the user has displayed and scrolled the display of the content information set 820 in the lower direction under the situation shown in Step B3. In the example shown in FIG. 5, a part of the content information pieces that have been newly added in Step B3 is displayed on the display screen 810 due to the scroll of the display of the content information set 820, the part including "#Prepend 17 News Content", "#Prepend 18 Image Content", "#Prepend 19 News Content", and "#Prepend 20 Image Content".

Here, in the present embodiment, a content information piece displayed on the display screen 810 at least once is regarded as a content information piece referred to once by the user. Accordingly, as shown by the situation of Step B4 in FIG. 5, display of the indicator 830 changes in accordance with the displaying and scrolling of the content information set 820 in a way similar to the first specific example. Specifically, the content information piece belonging to the updated part changes to the content information piece belonging to the display part, and subsequently the content information piece belonging to the display part changes to the content information piece belonging to the read part in accordance with displaying and scrolling of the content information set 820. Therefore, the length of the read part marking area 832a in the indicator 830 is lengthened, and the length of the updated part marking area 833 is shortened. In this way, the indicator generation unit 134 can acquire information on the display part, the read part, and the updated part of the content information set 820 from the display control unit 135 or the update detection unit 133 every time the display of the display screen 810 changes, and can generate the indicator 830 as needed on the basis of such information.

With reference to FIG. 5, there has been explained the second specific example of the update information notification process according to the present embodiment.

[3-3. Third Specific Example]

Next, with reference to FIG. 6, there is explained a third specific example of the update information notification process according to the present embodiment. FIG. 6 is an explanatory diagram illustrating a third specific example of the update information notification process according to the present embodiment.

In the first specific example and the second specific example, there has been explained the cases in which the number of content information pieces constituting the content information sets 720 and 820 increases when the content information sets 720 and 820 are updated. On the other hand, in the following third specific example, there is explained an update information notification process in a case in which contents of some content information pieces are changed among content information pieces constituting a content information set when the content information set is updated. In the third specific example, an arrangement sequence of the content information set is an order content information pieces are added as structural elements to the content information set (that is, the arrangement sequence does not change even after update of contents of the content information pieces that have already served as the structural elements of the content information set). Note that, as the case in which the contents of the some content information pieces are changed among the content information pieces constituting the content information set, for example, it is assumed that the content information piece is information on a comment posted on any SNS service by any user, and that the information indicating another user's response to the comment (for example, a response to the comment or a quote from the comment in the another user's comment) is added.

With reference to FIG. 6, a content information set 920 and an indicator 930 are shown in the display screen 910. Here, FIG. 6 shows a display example of the display screen 910 immediately after the content information set is updated automatically at a predetermined timing or in response to a predetermined operation input performed by a user and contents of the content information pieces constituting the content information set are changed. That is, FIG. 6 shows a display example of the display screen 910 in a situations corresponding to the situation shown in Step A3 and Step B3 in FIG. 4 and FIG. 5.

Among the content information pieces constituting the content information set 920, it can be said that a part of a content information piece whose content is changed is read by a user, and a part changed by the update (added part) is not read by the user. In the present embodiment, such content information piece may be considered as an updated part in the content information set 920 even if only a part of the content information piece is unread. Accordingly, in the content information set 920, updated parts and read parts are positioned not continuously but intermittently (in a skipping manner) with respect to an arrangement sequence of the updated parts and the read parts. Moreover, as shown in FIG. 6, a plurality of read part marking areas 932a, 932b, 932c, and 932d and a plurality of updated part marking areas 933a, 933b, and 933c present intermittently in the indicator 930 in addition to the display part marking area 931, in accordance with such configuration of the content information set 920. Accordingly, by referring to the indicator 930, the user can quickly grasp positions of the updated parts with respect to the whole content information set 920. Note that, in a way similar to the first specific example and the second specific example, in a case in which the display of the content information set 920 is scrolled in the situation of FIG. 6 and a content information piece belonging to the updated part is displayed on the display screen 910, the display of a corresponding updated part marking area is changed to a display indicating the read part marking area.

With reference to FIG. 6, there has been explained the third specific example of the update information notification process according to the present embodiment. As explained above, in the third specific example, it is difficult to preliminarily predict which of the content information pieces constituting the content information set 920 is updated, and updated parts are present intermittently in the content information set 920 after the update. For example, if a general indicator including no updated part marking area is used in such circumstance, it is difficult for a user to grasp positions of updated parts with respect to the whole content information set 920 even after referring to the general indicator.

However, in the third specific example, intermittent updated part marking area 933a, 933b, and 933c corresponding to updated parts existed intermittently are displayed in the indicator 930 as described above. Accordingly, by referring to the indicator 930, the user can quickly access the content information pieces included in the desired updated part. Therefore, convenience of the user can be improved.

Note that, FIG. 6 shows the case in which the updated part marking areas 933a, 933b, and 933c are displayed in a way similar to the updated part marking areas 733 and 833 displayed in the first specific example and the second specific example. However, the present embodiment is not limited thereto. Although the updated parts in the first specific example and the second specific example correspond to content information pieces in which all parts have never been read by a user, the updated parts in the third specific example correspond to content information pieces in which only some parts have never been read by the user. In the present embodiment, the updated part marking areas may be displayed in a way different from each other in an indicator in accordance with difference in such read/unread states for a user. For example, the indicator may be constituted by four areas including the display part marking area, the read part marking area, the updated part marking area in which all parts have never been read, and the updated part marking area in which only some parts have never been read in a manner that these four areas are displayed in a different way.

<4. Procedure in Update Information Notification Method>

Figure 7:
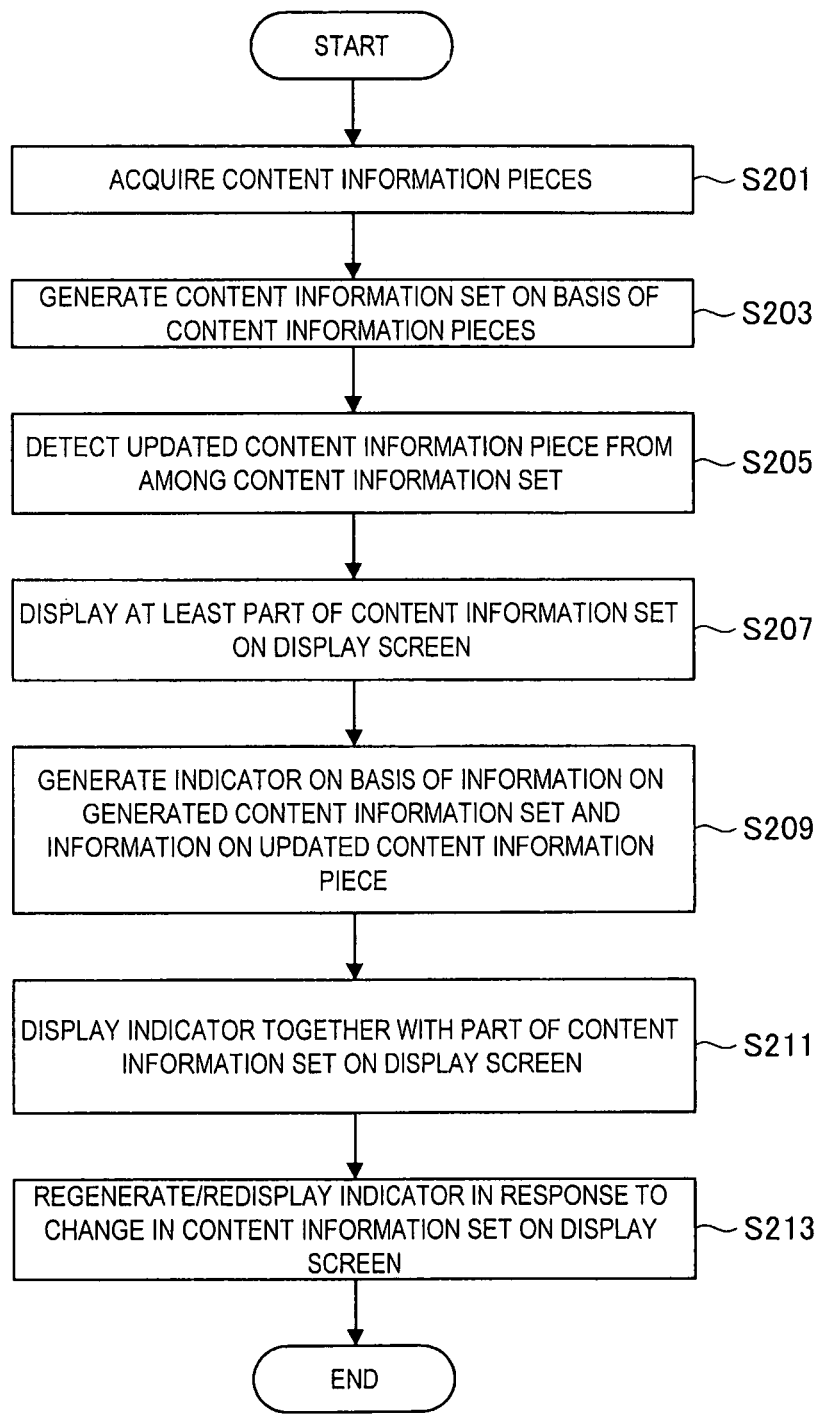
FIG. 7 is a flowchart showing an example of a procedure in an update information notification method according to an embodiment of the present disclosure.

Next, with reference to FIG. 7, there is explained a procedure in an update information notification method according to an embodiment of the present disclosure. FIG. 7 is a flowchart showing an example of a procedure in an update information notification method according to an embodiment of the present disclosure. Note that, in the following explanation of the procedure in the update information notification method, the update information notification method according to the present embodiment is performed by the structural elements of the information processing apparatus 10 shown in FIG. 3, for example. The functions and the configurations of the structural elements has already been explained in <2. Configuration of Information Processing Apparatus>, and detailed explanations thereof are omitted.

With reference to FIG. 7, first, in Step S201, the content information piece acquisition unit 131 acquires content information pieces. Here, the content information pieces may be acquired automatically at a predetermined timing, or may be acquired in response to a predetermined operation input performed by a user as shown in FIGS. 4 and 5.

Next, in Step S203, the content information set generation unit 132 generates a content information set by using the acquired content information pieces. The content information set is constituted by different content information pieces lined up in a predetermined arrangement sequence. The content information set corresponds to the content information set 620, 720, 820, or 920 shown in FIG. 2, FIG. 4, FIG. 5, or FIG. 6, for example.

Next, in Step S205, the update detection unit 133 detects an updated content information piece from among the content information set generated in Step S203. Here, the update detection unit 133 may detect the updated content information piece on the basis of change in the number or kinds of the content information pieces constituting the content information set, or may detect the updated content information piece on the basis of change in contents of the content information pieces constituting the content information set.

Alternatively, the update detection unit 133 may detect, as the updated content information piece, a content information piece that has never been displayed on the display screen in Step S207 (to be described alter) from among the content information pieces constituting the content information set.

Next, in Step S207, the display control unit 135 displays at least a part of the generated content information set on the display screen of the display unit 110. For example, the content information set is lined up and displayed in a row (list) in a predetermined arrangement sequence on the display screen. The user can scroll and display the content information set displayed on the display screen by a predetermined operation input.

Next, in Step S209, on the basis of information on the content information set generated in Step S203 and information on the updated content information piece detected in Step S205, the indicator generation unit 134 generates an indicator indicating at least a positional relation of an updated part with respect to the whole content information set, the updated part corresponding to the updated content information piece from among the content information set. For example, the indicator includes: an updated part marking area that indicates a positional relation of the updated part with respect to the whole content information set; the display part marking area that indicates a positional relation of a display part with respect to the whole content information set, the display part serving as a part displayed on the display screen; and a read part marking area that indicates a positional relation of a read part with respect to the whole content information set, the read part corresponding to the content information piece that is not included in the display part or the updated part. As explained above, it can be said that the indicator according to the present embodiment indicates a positional relation of the updated part, the display part, and the read part with respect to the whole content information set like a bird's eye view. The indicator corresponds to the indicator 630, 730, 830, and 930 shown in FIG. 2, FIG. 4, FIG. 5, or FIG. 6, for example.

Next, in Step S211, the display control unit 135 displays the indicator generated in Step S209 together with at least a part of the content information set on the display screen of the display unit 110. The display of the content information set and the indicator in the display screen corresponds to the display in the display screen 610, 710, 810, or 910 shown in FIG. 2, FIG. 4, FIG. 5, or FIG. 6, for example.

Next, in Step S213, the indicator generation unit 134 regenerates an indicator in response to change in the display of the content information set on the display screen, and the display control unit 135 redisplays the regenerated indicator on the display screen. As described about the process in Step S205, the content information piece that has never been displayed on the display screen from among the content information pieces constituting the content information set may be detected as the updated content information piece in this embodiment. Accordingly, in response to the change in the display of the content information set on the display screen, the display of the indicator is updated in real time as needed. The user can grasp the position of the updated content information piece (in other words, content information piece that has never been read by the user) while referring to the indicator, and can access a desired content information piece more easily.

Note that, in a case in which a predetermined timing has elapsed or a predetermined operation has been input while the processes in Steps S203 to S213 are being performed, the procedure returns to Step S201. Subsequently, a new content information piece is acquired, and a series of the processes in Step S203 to Step S213 is repeated.

With reference to FIG. 7, there has been explained the procedure in the update information notification method according to an embodiment of the present disclosure.

<5. Hardware Configuration>

Figure 8:
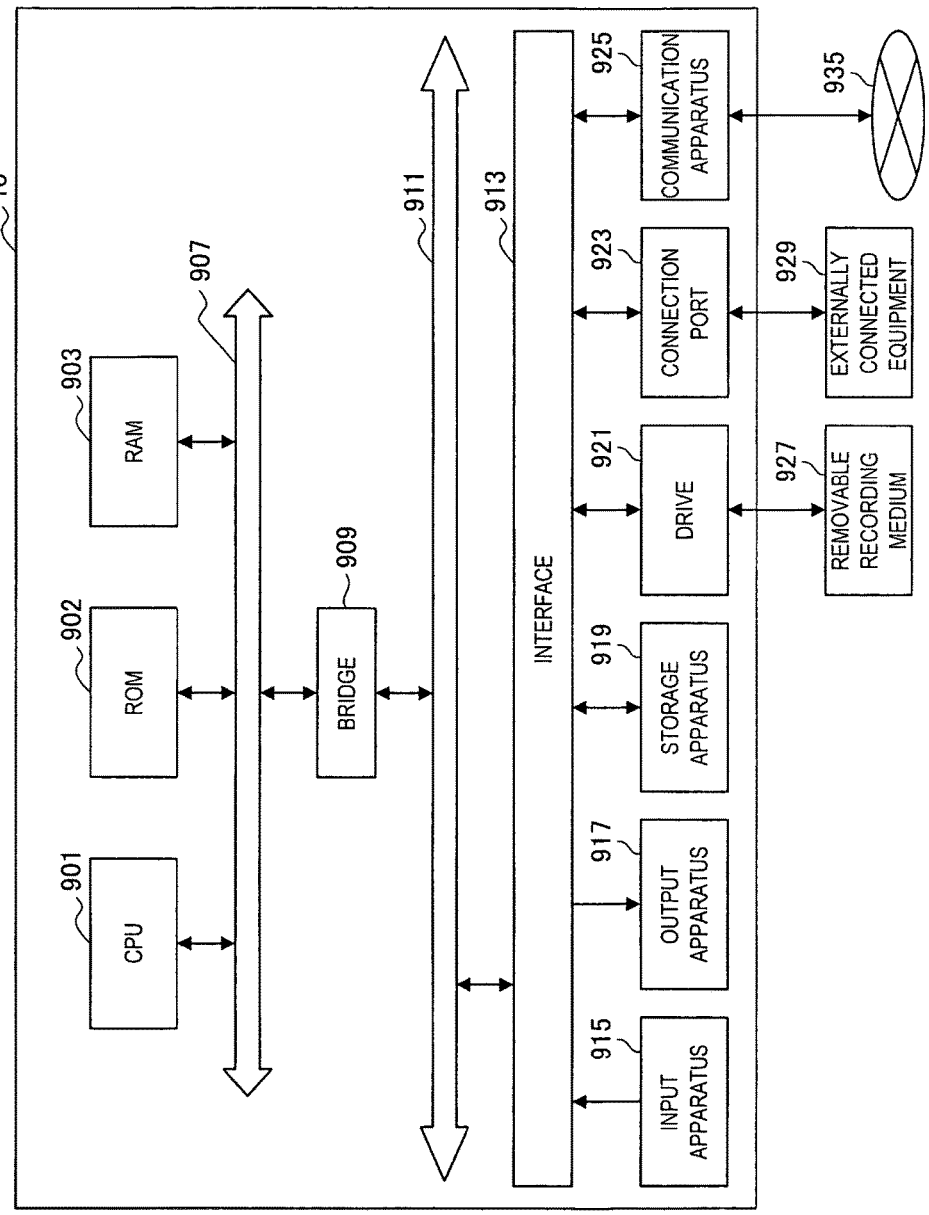
FIG. 8 is a functional block diagram showing a hardware configuration of an information processing apparatus according to an embodiment of the present disclosure.

Next, with reference to FIG. 8, there is explained a hardware configuration of the information processing apparatus 10 according to an embodiment of the present disclosure. FIG. 8 is a functional block diagram showing a hardware configuration of an information processing apparatus 10 according to an embodiment of the present disclosure.

The information processing apparatus 10 mainly includes a CPU 901, ROM 903, and RAM 905. Furthermore, the information processing apparatus 10 also includes a host bus 907, a bridge 909, an external bus 911, an interface 913, an input apparatus 915, an output apparatus 917, a storage apparatus 919, a drive 921, a connection port 923, and a communication apparatus 925.

The CPU 901 functions as an arithmetic processing apparatus and a control apparatus, and controls the overall operation or a part of the operation of the information processing apparatus 10 according to various programs recorded in the ROM 903, the RAM 905, the storage apparatus 919, or a removable recording medium 927. In the present embodiment, the CPU 901 corresponds to the control unit 130 shown in FIG. 3, and processes various kinds of information in the update information notification process according to the present embodiment, for example. The ROM 903 stores programs, operation parameters, and the like used by the CPU 901. The RAM 905 primarily stores programs that the CPU 901 uses and parameters and the like varying as appropriate during the execution of the programs. The CPU 901, the ROM 903, and the RAM 905 are connected with each other via the host bus 907 constituted by an internal bus such as a CPU bus or the like.

The host bus 907 is connected to the external bus 911 such as a Peripheral Component Interconnect/Interface (PCI) bus via the bridge 909. Via the interface 913, the external bus 911 is connected to the input apparatus 915, the output apparatus 917, the storage apparatus 919, the drive 921, the connection port 923, and the communication apparatus 925.

The input apparatus 915 is an operation means operated by a user, such as a mouse, a keyboard, a touchscreen, buttons, a switch and a lever. Also, the input apparatus 915 may be a remote control means (a so-called remote control) using, for example, infrared light or other radio waves, or may be externally connected equipment 929 such as a mobile phone or a PDA conforming to the operation of the information processing apparatus 10. Furthermore, the input apparatus 915 generates an input signal based on, for example, information input by a user with the above operation means, and is constituted by an input control circuit for outputting the input signal to the CPU 901. The user of the information processing apparatus 10 can input various data to the information processing apparatus 10 and can instruct the information processing apparatus 10 to perform processing by operating this input apparatus 915. In the present embodiment, the input apparatus 915 corresponds to the input unit 120 shown in FIG. 3, for example, and constitutes a touchscreen by being integrated with the display unit 110. By inputting an operation via the input unit 120, the user can input an instruction on update of a content information set, an instruction on scroll of display of a content information set displayed on the display screen, an instruction on activation of an application for reproducing and displaying content, and the like.

The output apparatus 917 is constituted by an apparatus capable of visually or audibly notifying various kinds of information to a user. Examples of such apparatus include display apparatuses such as a CRT display apparatus, a liquid crystal display apparatus, a plasma display apparatus, an EL display apparatus and lamps, audio output apparatuses such as a speaker and a headphone, a printer, a mobile phone, and the like. For example, the output apparatus 917 outputs a result obtained by various processes performed by the information processing apparatus 10. More specifically, the display apparatus displays, in the various form of texts, graphs, images, or the like, a result obtained by various kinds of processes performed by the information processing apparatus 10 on the display screen. In the present embodiment, for example, the display apparatus corresponds to the display unit 110 shown in FIG. 3. The display apparatus is controlled by the display control unit 135 and displays an indicator and at least a part a content information set on a display screen. On the other hand, the audio output apparatus converts an audio signal such as reproduced audio data and sound data into an analog signal, and outputs the analog signal.

Although not shown in FIG. 3, the information processing apparatus 10 may include the following structural elements.

The storage apparatus 919 is an apparatus configured as an example of a storage unit of the information processing apparatus 10 and is used to store data. The storage apparatus 919 is constituted by, for example, a magnetic storage device such as a hard disk drive (HDD), a semiconductor storage device, an optical storage device, a magneto-optical storage device, or the like. This storage apparatus 919 stores programs to be executed by the CPU 901, various data, and various data obtained from the outside. In the present embodiment, the storage apparatus 919 can store various kinds of information processed in the update information notification process, such as information on content information pieces, a generated content information set, and a generated indicator. The storage apparatus 919 may temporarily stores a newly acquired content information piece in internal cache memory, and may transmit the content information piece to the content information piece acquisition unit 131 at a predetermined timing or a timing when a user inputs a predetermined operation via the input apparatus 915 in response to a request from the content information piece acquisition unit 131.

The drive 921 is a reader/writer for recording medium, and is embedded in the information processing apparatus 10 or attached externally thereto. The drive 921 reads information recorded in the attached removable recording medium 927 such as a magnetic disk, an optical disk, a magneto-optical disk, or a semiconductor memory, and outputs the read information to the RAM 905. Furthermore, the drive 921 can write various kinds of information in the attached removable recording medium 927 such as a magnetic disk, an optical disk, a magneto-optical disk, or a semiconductor memory. The removable recording medium 927 is, for example, a DVD medium, an HD-DVD medium, or a Blu-ray (registered trademark) medium. The removable recording medium 927 may be a CompactFlash (CF; registered trademark), a flash memory, a Secure Digital (SD) memory card, or the like. Alternatively, the removable recording medium 927 may be, for example, an integrated circuit (IC) card equipped with a non-contact IC chip or an electronic appliance. In the present embodiment, the information processing apparatus 10 can read and write various kinds of information on the update information notification process from and in the removable recording medium 927 via the drive 921. For example, the content information piece acquisition unit 131 may acquire content information pieces from the removable recording medium 927 via the drive 921.

The connection port 923 is a port for allowing another external equipment to directly connect to the information processing apparatus 10. Examples of the connection port 923 include a Universal Serial Bus (USB) port, an IEEE1394 port, a Small Computer System Interface (SCSI) port, and the like. Other examples of the connection port 923 include an RS-232C port, an optical audio terminal, a High-Definition Multimedia Interface (HDMI) (registered trademark) port, and the like. By the externally connected equipment 929 connecting to this connection port 923, the information processing apparatus 10 directly acquires various kinds of information from the externally connected equipment 929 and provides various kinds of information to the externally connected equipment 929. In the present embodiment, via the connection port 923, the storage apparatus 10 can acquire and output various kinds of information on the update information notification process from and to the externally connected equipment 929. For example, the content information piece acquisition unit 131 may acquire content information pieces from the externally connected equipment 929 via the connection port 923.

The communication apparatus 925 is a communication interface constituted by, for example, a communication device for connecting to a communication network (network) 935. The communication apparatus 925 is, for example, a wired or wireless local area network (LAN), Bluetooth (registered trademark), a communication card for Wireless USB (WUSB), or the like. Alternatively, the communication apparatus 925 may be a router for optical communication, a router for an asymmetric digital subscriber line (ADSL), a modem for various communications, or the like. This communication apparatus 925 can transmit and receive signals and the like in accordance with a predetermined protocol such as TCP/IP on the Internet and with other communication equipment, for example. The network 935 connected to the communication apparatus 925 is constituted by a network and the like, which is connected via wire or wirelessly, and may be, for example, the Internet, a home LAN, infrared communication, radio wave communication, satellite communication, or the like. In the present embodiment, the communication apparatus 925 can transmit and receive various kinds of information to be processed in the update information notification process to and from another equipment connected via the network 935. The communication apparatus 925 may receive a new content information piece from another equipment connected via the network 935 at a predetermined timing or a timing when a user inputs a predetermined operation via the input apparatus 915 in response to a request from the content information piece acquisition unit 131.

Although not shown in FIG. 3 or FIG. 8, the information processing apparatus 10 may further include the following structural elements.

For example, the information processing apparatus 10 may include a sensor apparatus that detects information on an environment around the information processing apparatus 10. The sensor apparatus is a detecting mechanism such as a sensor that detects a movement of the information processing apparatus 10 or a sensor that acquires positional information indicating a current position. Examples of such sensor apparatus includes motion sensor apparatuses including a triaxial acceleration sensor apparatus such as an acceleration sensor apparatus, a gravity detecting sensor apparatus, or a fall detecting sensor apparatus and a triaxial gyro sensor apparatus such as an angular velocity sensor apparatus, a hand shake correction sensor apparatus, or a geomagnetic sensor apparatus, and a GPS sensor apparatus. In addition to the above sensor apparatuses, the sensor apparatus may include various known measurement apparatuses such as a thermometer, an illuminance meter, and a hygrometer.

For example, the information processing apparatus 10 may include an imaging apparatus such as a camera that images an imaging target in a moving image format or a still image format. Specifically, the imaging apparatus includes a plurality of light receiving elements arranged on two dimensions. The imaging apparatus can acquire an image signal representing an image of the imaging target by photoelectric conversion by the light receiving elements, and can generate a photograph and a movie of the imaging target by performing various kinds of signal processes on the imaging signal.

The information processing apparatus 10 may include a power supply apparatus (battery apparatus) that supplies power to the above structural elements in the information processing apparatus 10. To the power supply apparatus, various kinds of secondary batteries such as a lithium-ion secondary battery may be applied.

With reference to FIG. 8, there has been explained the example of the hardware configuration capable of achieving the functions of the information processing apparatus 10 according to an embodiment of the present disclosure. Each of the structural elements described above may be configured by using a general purpose component or may be configured by hardware specialized for the function of each of the structural elements. Thus, it is possible to appropriately modify a hardware configuration to be used according to technical levels at a time when the present embodiment is implemented.

It is possible to create a computer program that achieves the functions of the information processing apparatus 10 according to the present embodiment, and mount the program on a personal computer or the like. Moreover, it is possible to provide a computer-readable recording medium having such computer program stored therein. The recording medium may be a magnetic disk, an optical disc, a magneto-optical disk, or flash memory, for example. The computer program may be delivered via a network without using the recording medium, for example.

<6. Conclusion>

As described above, according to the present embodiment, the following effects are achieved.

According to the present embodiment, the content information set generation unit 132 generates a content information set including a series of content information pieces in a predetermined arrangement sequence, and the display control unit 135 displays a part of the content information set on the display screen in the arrangement sequence, the content information pieces being displayed in a predetermined area on a display screen. In addition, the update detection unit 133 detects an updated content information piece from among the content information set, and the indicator generation unit 134 generates an indicator indicating at least a positional relation of an updated part with respect to the whole content information set, the updated part corresponding to the updated content information piece from among the content information set. Subsequently, the display control unit 135 displays the indicator together with a part of the content information set on the display screen. Accordingly, by referring to the indicator, the user can quickly grasp a position of an updated part with respect to the whole content information set, and can quickly access the updated part. Therefore, convenience of the user can be further improved.

Note that, in the present embodiment, a part displayed on the display screen from among the updated part may be regarded as a read part that has been already referred to by the user. In addition, in response to the change from the updated part to the read part in the content information set, it may be possible to change display of the read part marking area and the updated part marking area in the indicator as needed. In this way, since the display of the indicator changes in real time in response to the change in the updated part, the user can acquire the positional information of the unread content information piece in the content information set as needed from the display of the indicator. Therefore, convenience of the user can be further improved.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, in the above embodiments, the content information set is displayed in a row (list) on the display screen, and the indicator is the so-called scroll indicator. However, the present embodiment is not limited thereto. With regard to the content information set according to the present embodiment, it is only necessary to line up content information pieces in a predetermined arrangement sequence, and any method may be applied as a method for displaying them on the display screen. In addition, the indicator according to the present embodiment may have any form according to the display of the content information set on the display screen. For example, the content information set may be displayed like a book on the display screen, and the content information pieces may be displayed on parts corresponding to pages of the book. When the user moves the operation body on the display screen in a direction in which the book is opened, an animation of turning the page of the book is displayed, and the display of the content information pieces may be switched. In addition, in the case in which the content information set is displayed like a book on the display screen, the indicator is displayed in a manner that the indicator has a linear shape stretching on the display screen in a direction in which the book is opened, and length of the line corresponds to the total number of pages of the book. In the case in which the indicator has the linear shape, an area corresponding to the updated part on the line may be displayed in a manner that, for example, a color or shape of the area is different from that of the other area. In addition, at a position corresponding to a current page (in other words, a display part) in the line serving as the indicator, a mark indicating the display part may be displayed on the display screen. For example, when the user performs an operation to slide the mark in a line, the content information pieces displayed on the display screen may be changed in a manner that a page of the book is turned in response to the sliding operation, the book representing the content information set.

Additionally, the present technology may also be configured as below.

(1)

An information processing apparatus including:

a content information set generation unit configured to generate a content information set including a series of content information pieces in a predetermined arrangement sequence, the content information pieces being displayed in a predetermined area on a display screen;

an update detection unit configured to detect an updated content information piece from among the content information pieces constituting the content information set; and a display control unit configured to display, on the display screen, an indicator indicating at least a positional relation of an updated part with respect to the whole content information set while displaying at least a part of the content information set on the display screen in the arrangement sequence, the updated part corresponding to the updated content information piece from among the content information set.

(2)

The information processing apparatus according to (1), wherein the update detection unit detects, as the updated content information piece, the content information piece newly added to the content information set by the content information set generation unit.

(3)

The information processing apparatus according to (1) or (2), wherein the update detection unit detects, as the updated content information piece, the content information piece that is not displayed on the display screen by the display control unit from among the content information pieces constituting the content information set.

(4)

The information processing apparatus according to any one of (1) to (3), wherein, there are displayed, in the indicator in a way different from each other, a display part marking area that indicates a positional relation of a display part with respect to the whole content information set, the display part corresponding to the content information piece displayed on the display screen from among the content information set, an updated part marking area that indicates a positional relation of the updated part with respect to the whole content information set, and a read part marking area that indicates a positional relation of a read part with respect to the whole content information set, the read part corresponding to the content information piece that is not included in the display part or the updated part from among the content information set.

(5)

The information processing apparatus according to (4), wherein a part of the content information set is displayed in the arrangement sequence in a first direction on the display screen, and wherein the indicator has a linear shape stretching in the first direction on the display screen.

(6)

The information processing apparatus according to (5), wherein, in the indicator, the display part marking area, the updated part marking area, and the read part marking area each have a different color.

(7)

The information processing apparatus according to (5) or (6), wherein, in the indicator, the display part marking area, the updated part marking area, and the read part marking area each have a different shape.

(8)

The information processing apparatus according to any one of (5) to (7), wherein, when the indicator is displayed on the display screen, a size of the display part marking area reflects a ratio of the number of the content information pieces constituting the display part to the total number of the content information pieces constituting the content information set, a size of the updated part marking area reflects a ratio of the number of the content information pieces constituting the updated part to the total number of the content information pieces constituting the content information set, and a size of the read part marking area reflects a ratio of the number of the content information pieces constituting the read part to the total number of the content information pieces constituting the content information set.

(9)

The information processing apparatus according to any one of (1) to (8), further including:

a content information piece acquisition unit configured to acquire the content information pieces, wherein the content information set generation unit generates the content information set on the basis of content information pieces acquired by the content information piece acquisition unit.

(10)

The information processing apparatus according to (9), wherein the content information set generation unit updates the content information set by adding a content information piece newly acquired by the content information piece acquisition unit to the already generated content information set.

(11)

The information processing apparatus according to (10), wherein the content information set generation unit updates the content information set by using a content information piece newly acquired by the content information piece acquisition unit and increasing the number of content information pieces constituting the content information set.

(12)

The information processing apparatus according to (10), wherein the content information set generation unit updates the content information set by using a content information piece newly acquired by the content information piece acquisition unit and changing contents of the content information pieces constituting the already generated content information set.

(13)

The information processing apparatus according to any one of (9) to (12), wherein the arrangement sequence in the content information set corresponds to an order the content information piece acquisition unit has acquired the content information pieces.

(14)

The information processing apparatus according to any one of (9) to (13), wherein the content information piece acquisition unit acquires the content information piece automatically at a predetermined timing.

(15)

The information processing apparatus according to any one of (9) to (14), wherein the content information piece acquisition unit acquires the content information piece at a timing according to a predetermined operation input performed by a user.

(16)

The information processing apparatus according to any one of (1) to (15), wherein the content information set is arranged in a row in the arrangement sequence and displayed on the display screen.

(17)

An update information notification method including:

generating a content information set including a series of content information pieces in a predetermined arrangement sequence, the content information pieces being displayed in a predetermined area on a display screen;

detecting an updated content information piece from among the content information pieces constituting the content information set; and displaying, on the display screen, an indicator indicating at least a positional relation of an updated part with respect to the whole content information set while displaying at least a part of the content information set on the display screen in the arrangement sequence, the updated part corresponding to the updated content information piece from among the content information set.

(18)

A program causing a computer to execute:

a function of generating a content information set including a series of content information pieces in a predetermined arrangement sequence, the content information pieces being displayed in a predetermined area on a display screen;

a function of detecting an updated content information piece from among the content information pieces constituting the content information set; and a function of displaying, on the display screen, an indicator indicating at least a positional relation of an updated part with respect to the whole content information set while displaying at least a part of the content information set on the display screen in the arrangement sequence, the updated part corresponding to the updated content information piece from among the content information set.

REFERENCE SIGNS LIST 10 information processing apparatus
110 display unit
120 input unit
130 control unit
131 content information piece acquisition unit
132 content information set generation unit
133 update detection unit
134 indicator generation unit
135 display control unit

The invention claimed is:

1. An information processing apparatus, comprising:
circuitry configured to:
acquire a plurality of content information pieces;
set, in an arrangement sequence, a plurality of groups from among the plurality of content information pieces based on a type of each of the plurality of content information pieces;
generate a content information set comprising the plurality of groups in the arrangement sequence;
control a display device to display the content information set;
detect a change in a first number of content information pieces in at least one group of the plurality of groups;

determine one or more updated content information pieces from among the content information pieces in the at least one group, based on the detected change;

generate an indicator based on the content information set and the one or more updated content information pieces, wherein the indicator comprises a display part marking area, a plurality of read part marking areas, a first plurality of updated part marking areas, and a second plurality of updated part marking areas, the display part marking area, the plurality of read part marking areas, the first plurality of updated part marking areas, and the second plurality of updated part marking areas have at least one of a different color from each other or a different shape from each other, one of the first plurality of updated part marking areas or the second plurality of updated part marking areas are associated with a part of the plurality of read part marking areas, and one of the first plurality of updated part marking areas or the second plurality of updated part marking areas and the part of the plurality of read part marking areas are intermittently present in the arrangement sequence, and each associated updated part marking area and read part marking area are displayed next to each other; control the display device to display the indicator; and update the display of the indicator based on a scroll of the display of the content information set, wherein the update of the display corresponds to a conversion of a first part of a first updated part marking area of one of the first plurality of updated part marking areas or the second plurality of updated part marking areas into a second part of the display part marking area and a conversion of a third part of the display part marking area into a fourth part of a first read part marking area of the plurality of read part marking areas.

2. The information processing apparatus according to claim 1, wherein the circuitry is further configured to determine, as the one or more updated content information pieces, at least a first content information piece from among the plurality of content information pieces, that is latest in the content information set.

3. The information processing apparatus according to claim 1, wherein the circuitry is further configured to determine, as the one or more updated content information pieces, at least a first content information piece from among the plurality of content information pieces, that is not displayed on the display device.

4. The information processing apparatus according to claim 1, wherein the display part marking area indicates a display part of the content information set corresponding to a first content information piece from among the plurality of content information pieces, each of the first plurality of updated part marking areas and the second plurality of updated part marking areas indicates an updated part of the content information set corresponding to the one or more updated content information pieces, and each of the plurality of read part marking areas indicates a read part of the content information set corresponding to a second content information piece from among the plurality of content information pieces displayed on the display device prior to display of the display part on the display device.

5. The information processing apparatus according to claim 4, wherein the circuitry is further configured to control the display device to display the content information set in the arrangement sequence in a first direction on the display device, and the indicator has a linear shape in the first direction on the display device.

6. The information processing apparatus according to claim 5, wherein a first size of the display part marking area corresponds to a first ratio of a second number of the plurality of content information pieces of the display part to a total number of the plurality of content information pieces of the content information set, a second size of each of the first plurality of updated part marking areas and the second plurality of updated part marking areas corresponds to a second ratio of a third number of the plurality of content information pieces of the updated part to the total number of the plurality of content information pieces of the content information set, and a third size of each of the plurality of read part marking areas corresponds to a third ratio of a fourth number of the plurality of content information pieces of the read part to the total number of the plurality of content information pieces of the content information set.

7. The information processing apparatus according to claim 1, wherein the circuitry is further configured to generate the content information set based on the plurality of content information pieces.

8. The information processing apparatus according to claim 7, wherein the circuitry is further configured to:

add a third content information piece to the content information set; and update the content information set based on the third content information piece.

9. The information processing apparatus according to claim 8, wherein the circuitry is further configured to:

change the first number of content information pieces in the at least one group, based on the third content information piece; and update the content information set based on the change.

10. The information processing apparatus according to claim 7, wherein the circuitry is further configured to acquire the plurality of content information pieces at a time based on a user input operation.

11. The information processing apparatus according to claim 1, wherein the arrangement sequence in the content information set corresponds to an order of the acquisition of the plurality of content information pieces.

12. The information processing apparatus according to claim 1, wherein the circuitry is further configured to acquire the plurality of content information pieces automatically in a time period.

13. The information processing apparatus according to claim 1, wherein the content information set is in a row in the arrangement sequence.

14. An update information notification method, comprising:

acquiring a plurality of content information pieces;

setting, in an arrangement sequence, a plurality of groups from among the plurality of content information pieces based on a type of each of the plurality of content information pieces;
generating a content information set comprising the plurality of groups in the arrangement sequence;
controlling a display device to display the content information set;
detecting a change in a first number of content information pieces in at least one group of the plurality of groups;
determining one or more updated content information pieces from among the content information pieces in the at least one group, based on the detected change;
generating an indicator based on the content information set and the one or more updated content information pieces,
wherein
the indicator comprises a display part marking area, a plurality of read part marking areas, a first plurality of updated part marking areas, and a second plurality of updated part marking areas,
the display part marking area, the plurality of read part marking areas, the first plurality of updated part marking areas, and the second plurality of updated part marking areas have at least one of a different color from each other or a different shape from each other,
one of the first plurality of updated part marking areas or the second plurality of updated part marking areas are associated with a part of the plurality of read part marking areas, and
one of the first plurality of updated part marking areas or the second plurality of updated part marking areas and the part of the plurality of read part marking areas are intermittently present in the arrangement sequence, and each associated updated part marking area and read part marking area are displayed next to each other;
controlling the display device to display the indicator; and
updating the display of the indicator based on a scroll of the display of the content information set,
wherein the update of the display corresponds to a conversion of a first part of a first updated part marking area of one of the first plurality of updated part marking areas or the second plurality of updated part marking areas into a second part of the display part marking area and a conversion of a third part of the display part marking area into a fourth part of a first read part marking area of the plurality of read part marking areas.

15. A non-transitory computer-readable medium having stored thereon computer-executable instructions which when executed by a computer, cause the computer to execute operations, the operations comprising:

acquiring a plurality of content information pieces;
setting, in an arrangement sequence, a plurality of groups from among the plurality of content information pieces based on a type of each of the plurality of content information pieces;
generating a content information set comprising the plurality of groups in the arrangement sequence;
controlling a display device to display the content information set;
detecting a change in a first number of content information pieces in at least one group of the plurality of groups;
determining one or more updated content information pieces from among the content information pieces in the at least one group, based on the detected change;
generating an indicator based on the content information set and the one or more updated content information pieces,
wherein
the indicator comprises a display part marking area, a plurality of read part marking areas, a first plurality of updated part marking areas, and a second plurality of updated part marking areas,
the display part marking area, the plurality of read part marking areas, the first plurality of updated part marking areas, and the second plurality of updated part marking areas have at least one of a different color from each other or a different shape from each other,
one of the first plurality of updated part marking areas or the second plurality of updated part marking areas are associated with a part of the plurality of read part marking areas, and
one of the first plurality of updated part marking areas or the second plurality of updated part marking areas and the part of the plurality of read part marking areas are intermittently present in the arrangement sequence, and each associated updated part marking area and read part marking area are displayed next to each other;
controlling the display device to display the indicator; and
updating the display of the indicator based on a scroll of the display of the content information set,
wherein the update of the display corresponds to a conversion of a first part of a first updated part marking area of one of the first plurality of updated part marking areas or the second plurality of updated part marking areas into a second part of the display part marking area and a conversion of a third part of the display part marking area into a fourth part of a first read part marking area of the plurality of read part marking areas.

* * * * *